(12) United States Patent
Hashimoto et al.

(10) Patent No.: US 8,861,022 B2
(45) Date of Patent: Oct. 14, 2014

(54) IMAGE PROCESSING APPARATUS WITH PREVIEW DISPLAY FUNCTION, IMAGE PROCESSING METHOD, AND IMAGE PROCESSING PROGRAM

(75) Inventors: Masaya Hashimoto, Itami (JP); Hisashi Uchida, Kuze-gun (JP); Yoshiyuki Tamai, Itami (JP); Kazusei Takahashi, Nishinomiya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1265 days.

(21) Appl. No.: 12/468,328

(22) Filed: May 19, 2009

(65) Prior Publication Data

US 2009/0290182 A1 Nov. 26, 2009

(30) Foreign Application Priority Data

May 23, 2008 (JP) ................................. 2008-135830

(51) Int. Cl.
| | | |
|---|---|---|
| G06F 15/00 | (2006.01) | |
| G06F 3/12 | (2006.01) | |
| G03F 3/10 | (2006.01) | |
| G06K 15/00 | (2006.01) | |
| G03G 15/00 | (2006.01) | |

(52) U.S. Cl.
CPC ............ *G06K 15/005* (2013.01); *G03G 15/502* (2013.01); *G06F 3/1296* (2013.01); *G03G 2215/00109* (2013.01)
USPC ............................ 358/1.9; 358/1.15; 358/527

(58) Field of Classification Search
None
See application file for complete search history.

(56) References Cited

U.S. PATENT DOCUMENTS

| 5,847,848 | A | 12/1998 | Suzuki et al. |
| 7,986,298 | B1 * | 7/2011 | Dulaney et al. ............... 345/156 |
| 8,086,961 | B2 * | 12/2011 | Saeki et al. ................... 715/274 |
| 2007/0133073 | A1 * | 6/2007 | Shida et al. ................... 358/527 |
| 2008/0007482 | A1 * | 1/2008 | Morioka ........................ 345/1.1 |
| 2008/0218776 | A1 * | 9/2008 | Takami et al. ................. 358/1.6 |

FOREIGN PATENT DOCUMENTS

| JP | 08-023437 | 1/1996 |
| JP | 10-126606 A | 5/1998 |
| JP | 2001-014130 | 1/2001 |
| JP | 2003-208300 | 7/2003 |
| JP | 2004-164169 | 6/2004 |

(Continued)

OTHER PUBLICATIONS

Notice of Grounds of Rejection issued in the corresponding Japanese Patent Application No. 2008-135830 dated Apr. 20, 2010, and an English Translation thereof.

*Primary Examiner* — Marcus T Riley
(74) *Attorney, Agent, or Firm* — Buchanan Ingersoll & Rooney PC

(57) ABSTRACT

On an operation panel, a preview image based on first preview image data generated by a first preview image generator is displayed (first stage), and then, a preview image based on second preview image data generated by a second preview image generator is displayed (second stage). An image reducing unit reduces input image data into an image size appropriate for the preview image to generate third preview image data. When image synthesis processing is set as user setting, an image processing unit changes, in accordance with the user setting, a display aspect of at least a portion of an area on the third preview image data corresponding to an area on the input image data in which another image data (a fixed pattern or the like) is to be synthesized.

19 Claims, 25 Drawing Sheets

(56) References Cited

FOREIGN PATENT DOCUMENTS

| | | |
|---|---|---|
| JP | 2004-192394 | 7/2004 |
| JP | 2006-215745 | 8/2006 |
| JP | 2007-36809 A | 2/2007 |
| JP | 2007-048214 | 2/2007 |
| JP | 2007-185946 | 7/2007 |

* cited by examiner

FIG. 4
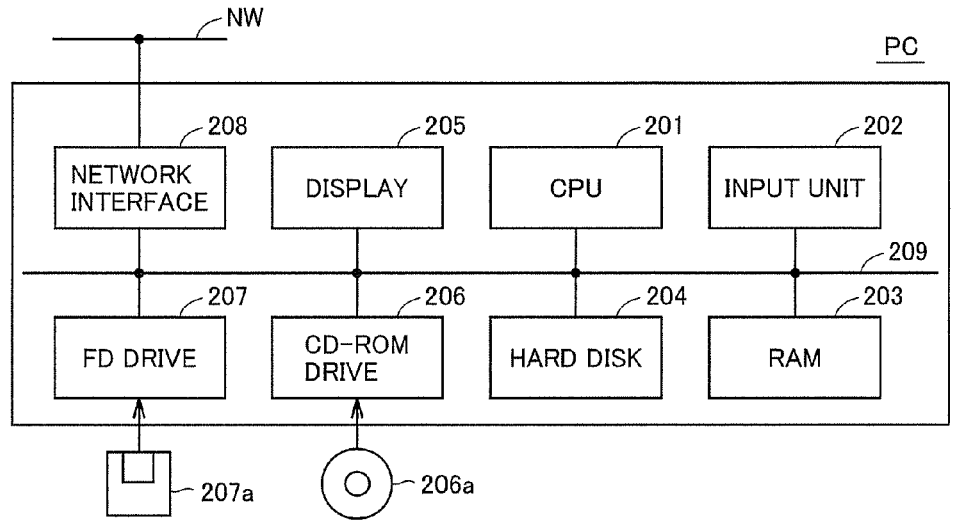
FIG. 5A
FIG. 5B
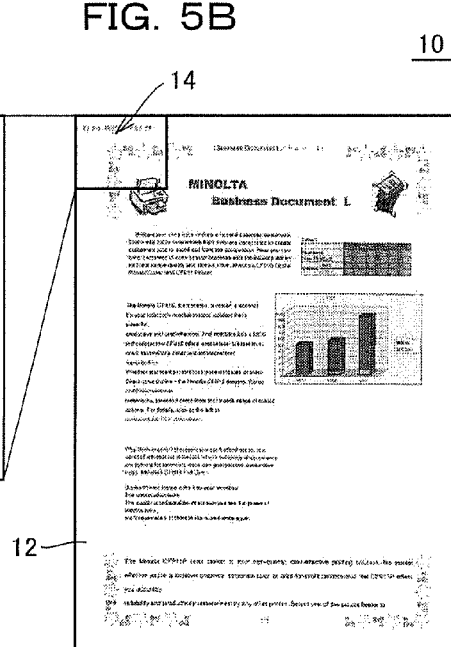

FIG. 7A
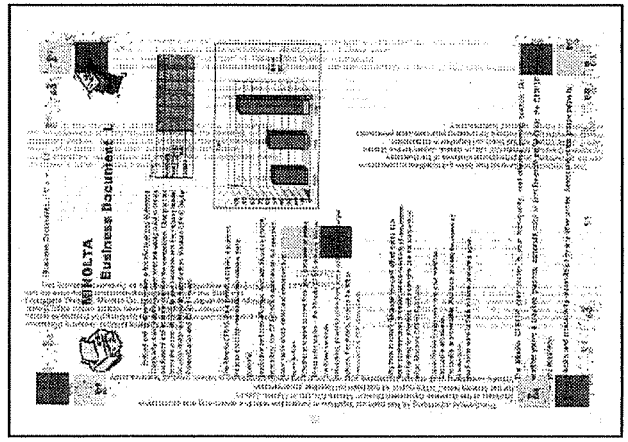
RESULT OF OVERLAY PROCESSING
FIG. 7B
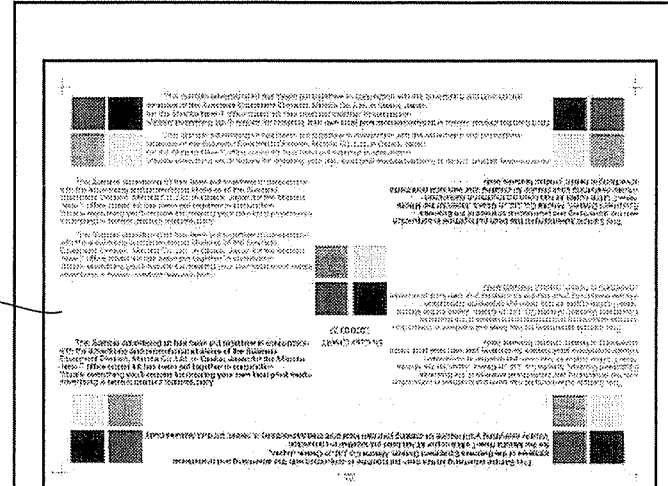
FORM
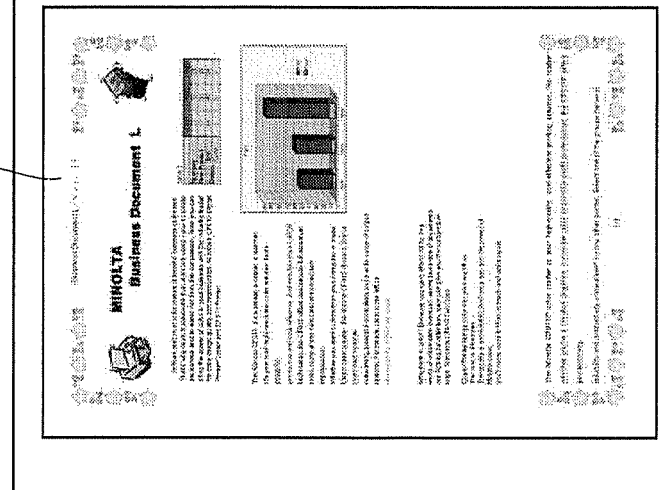
DOCUMENT

IMAGE PROCESSING APPARATUS WITH PREVIEW DISPLAY FUNCTION, IMAGE PROCESSING METHOD, AND IMAGE PROCESSING PROGRAM

This application is based on Japanese Patent Application No. 2008-135830 filed with the Japan Patent Office on May 23, 2008, the entire content of which is hereby incorporated by reference.

BACKGROUND OF THE INVENTION

1. Field of the Invention

The present invention relates to an image processing apparatus, an image processing method, and an image processing program, which are capable of displaying a preview of image generated by image processing before outputting the image data.

2. Description of the Related Art

With recent progress of information and communication technology, the amount of printed-out paper has increased. Meanwhile, it is preferable from an environmental point of view to reduce wasteful printing-out as much as possible, thereby achieving resource saving. Therefore, among image processing apparatuses such as a multi function peripheral (hereinafter, also referred to as "MFP"), there are ones with a function of displaying a print image prior to printing-out the same on paper, so called preview display function.

For example, in Japanese Laid-Open Patent Publication No. 10-126606, there is disclosed an image processing apparatus in which when a preview of an image obtained by operating a document is displayed on a display device, and if editing processing is instructed to a predetermined specified area of the image, an outer frame of the specified area is displayed, and processing contents within the area are also displayed as specific textual information.

Moreover, in Japanese Laid-Open Patent Publication No. 2007-036809, there is disclosed an image forming apparatus that displays a document scanning image with a staple position set on a preview screen. On this preview screen, the staple position and a screen area are simultaneously displayed at high speed with the image area shown simply.

In recent years, processing such as image processing and image editing has been increasingly sophisticated. For such sophisticated image processing, relatively much time is often required, and thus, there has been a problem that time from an operation by a user for displaying a preview image to actual display of the preview image on a display device is long.

SUMMARY OF THE INVENTION

The present invention is achieved to solve the above-described problem, and an object thereof is to provide an image processing apparatus, an image processing method and a storage medium that stores an image processing program, which are capable of quickly displaying a preview of an output image.

An image processing apparatus according to an aspect of the present invention includes a display, and an input unit for receiving an operation by a user for user setting, an image processor for generating, by image-processing first image data in accordance with the user setting, second image data, and a controller for providing a preview display on the display prior to outputting the second image data. The controller includes a first image generator for generating first preview image data from the first image data, and for displaying a first preview image on the display based on the generated first preview image data, and a second image generator for generating second preview image data corresponding to the second image data, and for updating the preview display on the display from the first preview image to a second preview image based on the generated second preview image data.

Preferably, the image-processing includes image synthesis processing of synthesizing third image data on the first image data to thereby generate the second image data, and the first image generator generates the first preview image data that is changed in a screen appearance of an area corresponding to an area on the first image data in which the third image data is to be synthesized.

More preferably, the second image generator generates the second preview image data from the second image data generated by the image processor.

Alternatively, more preferably, the first image generator generates third preview image data having a smaller image size from the first image data, stores the generated third preview image data, and generates the first preview image data from the third preview image data, and the second image generator generates the second preview image data from the third preview image data stored by the first image generator.

More preferably, the second image generator regenerates, in response to change of the user setting relating to the image synthesis processing, the second preview image data from the third preview image data stored by the first image generator.

Alternatively, more preferably, the first image generator generates the first preview image data by executing at least any one of adding a frame indicating the area in which the third image data is to be synthesized, changing a characteristic value of a pixel included in the area in which the third image data is to be synthesized, and replacing the area in which the third image data is to be synthesized by a predetermined pattern image.

Moreover, preferably, the image-processing includes image conversion processing of converting the first image data to the second image data having an output mode specified by the user setting, the image processor determines requirement of the image conversion processing based on an attribute of the first image data and the user setting, and executes the image conversion processing to generate the second image data when the image conversion processing is determined to be required.

More preferably, the second image generator generates the second preview image data from the generated second image data when the image conversion processing to the first image data is executed by the image processor.

Alternatively, more preferably, the first image generator generates the first preview image data having a smaller image size from the first image data, and stores the generated first preview image data, and the second image generator image-converts the first preview image data stored by the first image generator to generate the second preview image data.

More preferably, the second image generator regenerates, in response to change of the user setting relating to the image conversion processing, the second preview image data from the first preview image data stored by the first image generator.

Moreover, preferably, the controller causes the display to display, in addition to the preview display, that generation of the second preview image data is in processing in at least a part of a period between the time the first preview image is displayed and the time the displayed first preview image is updated to the second preview image.

According to another aspect of the present invention, there is provided an image processing method in an image processing apparatus having a display and an input unit. The present image processing method includes the steps of generating, by image-processing first image data in accordance with user setting, second image data, and providing a preview display on the display prior to outputting the second image data. The step of providing the preview display includes the steps of generating first preview image data from the first image data, displaying a first preview image on the display based on the generated first preview image data, generating second preview image data corresponding to the second image data, and updating the preview display on the display from the first preview image to a second preview image based on the generated second preview image data.

Preferably, the image-processing includes image synthesis processing of synthesizing third image data on the first image data to thereby generate the second image data, and the step of displaying the first preview image includes the step of generating the first preview image data that is changed in a screen appearance of a portion of an area corresponding to an area on the first image data in which the third image data is to be synthesized.

More preferably, the step of displaying the second preview image data includes the step of generating the second preview image data includes the step of generating the second preview image data from the second image data.

Alternatively, more preferably, the step of generating the first preview image data includes the steps of generating third preview image data having a smaller image size from the first image data, storing the generated third preview image data, and generating the first preview image data from the third preview image data, and the step of generating the second preview image data includes the step of generating the second preview image data from the stored third preview image data.

More preferably, the present image processing method further includes the step of regenerating, in response to change of the user setting relating to the image synthesis processing, the second preview image data from the stored third preview image data.

Alternatively, more preferably, the step of displaying the first preview image includes the step of generating the first preview image data by executing at least any one of adding a frame indicating the area in which the third image data is to be synthesized, changing a characteristic value of a pixel included in the area in which the third image data is to be synthesized, and replacing the area in which the third image data is to be synthesized by a predetermined pattern image.

Moreover, preferably, the image-processing includes image-conversion processing of converting the first image data to the second image data having an output mode specified by the user setting, the step of generating the second image data includes the steps of determining requirement of the image conversion processing based on an attribute of the first image data and the user setting, and executing the image conversion processing to generate the second image data when the image conversion processing is determined to be required.

More preferably, the step of generating the second preview image data includes the step of generating the second preview image data from the generated second image data when the image conversion processing to the first image data is executed.

Alternatively, more preferably, the steps of generating the first preview image data includes the steps of generating the first preview image data having a smaller image size from the first image data, and storing the generated first preview image data, and the step of generating the second preview image data includes the step of image-converting the stored first preview image data to generate the second preview image data.

More preferably, the present image processing method includes the step of regenerating, in response to change of the user setting relating to the image conversion processing, the second preview image data from the stored first preview image data.

Moreover, preferably, the step of providing the preview display further includes the step of displaying that generation of the second preview image data is in processing in at least a part of a period between the time the first preview image is displayed and the time the displayed first preview image is updated to the second preview image.

According to still another aspect of the present invention, there is provided a computer-readable medium that stores an image processing program for executing an image processing method in a computer having a display and an input unit. The image processing program causes the computer to execute the steps of generating, by image-processing first image data in accordance with user setting, second image data, and providing a preview display on the display prior to outputting the second image data. The step of providing the preview display including the steps of generating first preview image data from the first image data, displaying a first preview image on the display based on the generated first preview image data, generating second preview image data corresponding to the second image data, and updating the preview display on the display from the first preview image to a second preview image based on the generated second preview image data.

According to the present invention, the preview display of the output image can be performed quickly.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic configuration diagram of hardware of a personal computer according to Embodiment 1 of the present invention.

FIGS. 5A and 5B are diagrams showing one example of a result of stamp processing executed in the MFP according to Embodiment 1 of the present invention.

FIGS. 7A and 7B are diagrams showing one example of a result of overlay processing executed in the MFP according to Embodiment 1 of the present invention.

DESCRIPTION OF THE PREFERRED EMBODIMENTS

Figure 1:
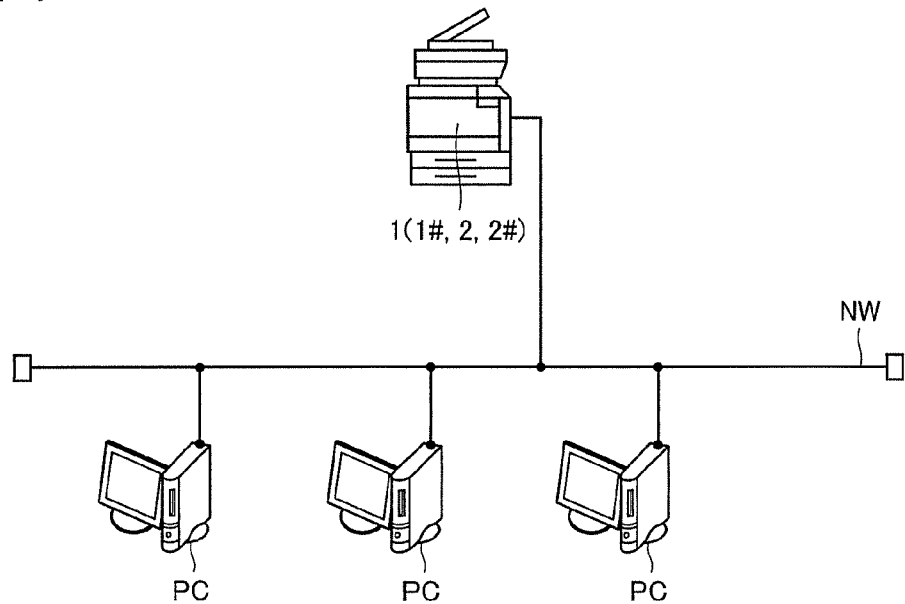
FIG. 1 is a schematic configuration diagram of an overall system including an MFP according to Embodiment 1 of the present invention.

Referring to the drawings, detailed descriptions of embodiments of the present invention are given. For the same or corresponding portions in drawings, the same symbols are given thereto, and descriptions thereof are not repeated.

In the embodiments described below of the present invention, as a representative example of an image processing apparatus according to the present invention, a multi function peripheral (hereinafter, also referred to as MFP) having a plurality of functions such as a copy function (monochrome and/or color), printing function, facsimile transmission/reception function, and image scanning function is illustrated. As will be described later, the image processing apparatus according to the present invention may be implemented by a personal computer or the like.

Embodiment 1

<System Configuration>

In a system shown in FIG. 1, an MFP 1 according to Embodiment 1 of the present invention and at least one personal computer PC are configured so as to be capable of intercommunicating data through a network NW. MFP 1 can perform image processing in accordance with user setting to image data scanned by an image scanner (described later) mounted thereon, image data received from personal computer PC or another server device (not shown), image data of a facsimile received through a telephone line not shown or the like, and so on (hereinafter, collectively referred to as "input image data") to thereby generate an image data (hereinafter, referred to as "output image data"). The image data transmitted from personal computer PC may be created by a document creating application executed in the personal computer.

Furthermore, MFP 1, in accordance with a user operation, can perform processing such as printing-out of the output image data onto paper, transmission of the output image data by facsimile, storage in a recording medium of the output image data, download of the output image data to personal computer PC, upload of the output image data to the server device, and the like. Herein, the "output" of the output image data collectively refers to processing of outputting the output image data itself or substance of the output image data outside MFP 1 as the image processing apparatus.

<Configuration of MFP>

Figure 2:
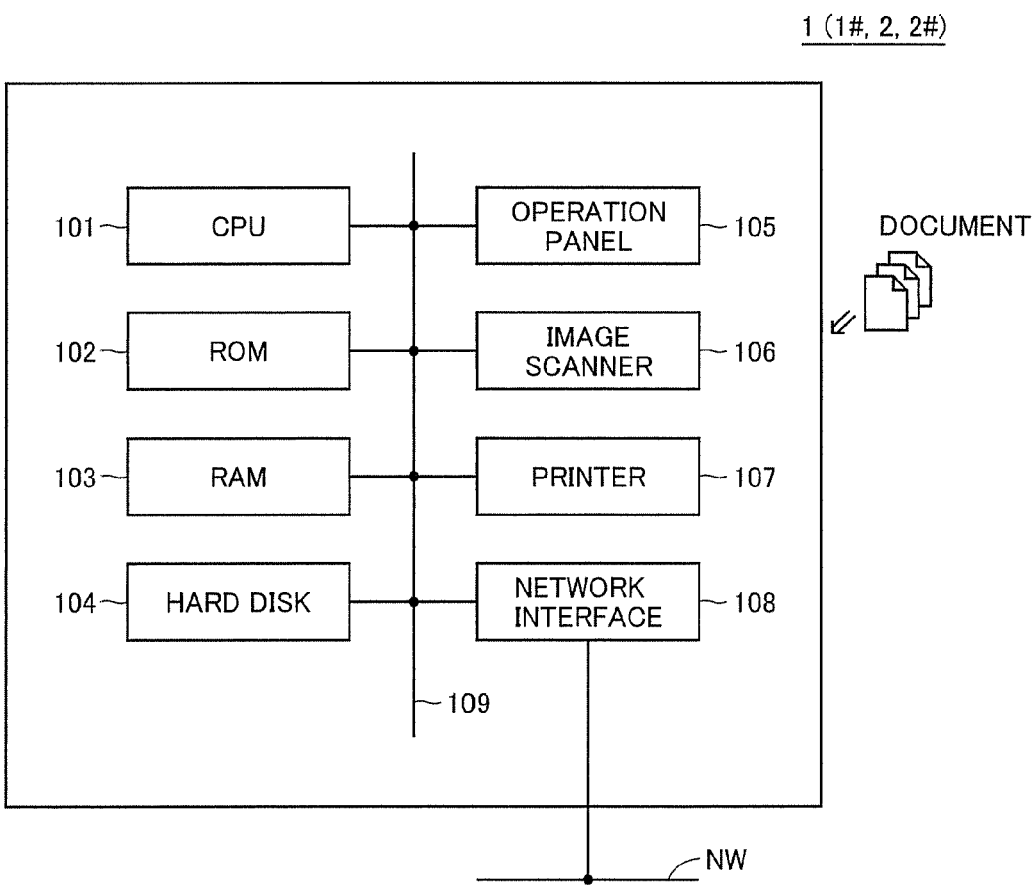
FIG. 2 is a schematic configuration diagram of hardware of the MFP according to Embodiment 1 of the present invention.

Referring to FIG. 2, MFP 1 includes a CPU (Central Processing Unit) 101, a ROM (Read Only Memory) 102, a RAM (Random Access Memory) 103, a hard disk 104, an operation panel 105, an image scanner 106, a printer 107, and a network interface 108, and the respective units are interconnected through an internal bus 110.

CPU 101 is a processor that provides an image processing method according to the present embodiment by reading out, in RAM 103, a program stored in ROM 102, hard disk 104, or the like in advance to execute the same. ROM 102 stores the program to be executed in CPU 101, various setting values and the like in a nonvolatile manner. RAM 103 is a volatile storage device representatively including DRAM (Dynamic Random Access Memory), temporarily storing the program to be executed in a controller 100, data necessary for the execution of the program, and the like. Particularly, RAM 103 temporarily stores image data generated in a process of image processing described later. Hard disk 104 stores input image data scanned in image scanner 106, input image data externally inputted through network NW or the like. When the storage function of the input image data by hard disk 104 is focused on, hard disk 104 is also referred to as "Box".

Operation panel 105 is a user interface for receiving various user operations and displaying various types of information to a user.

Figure 3:
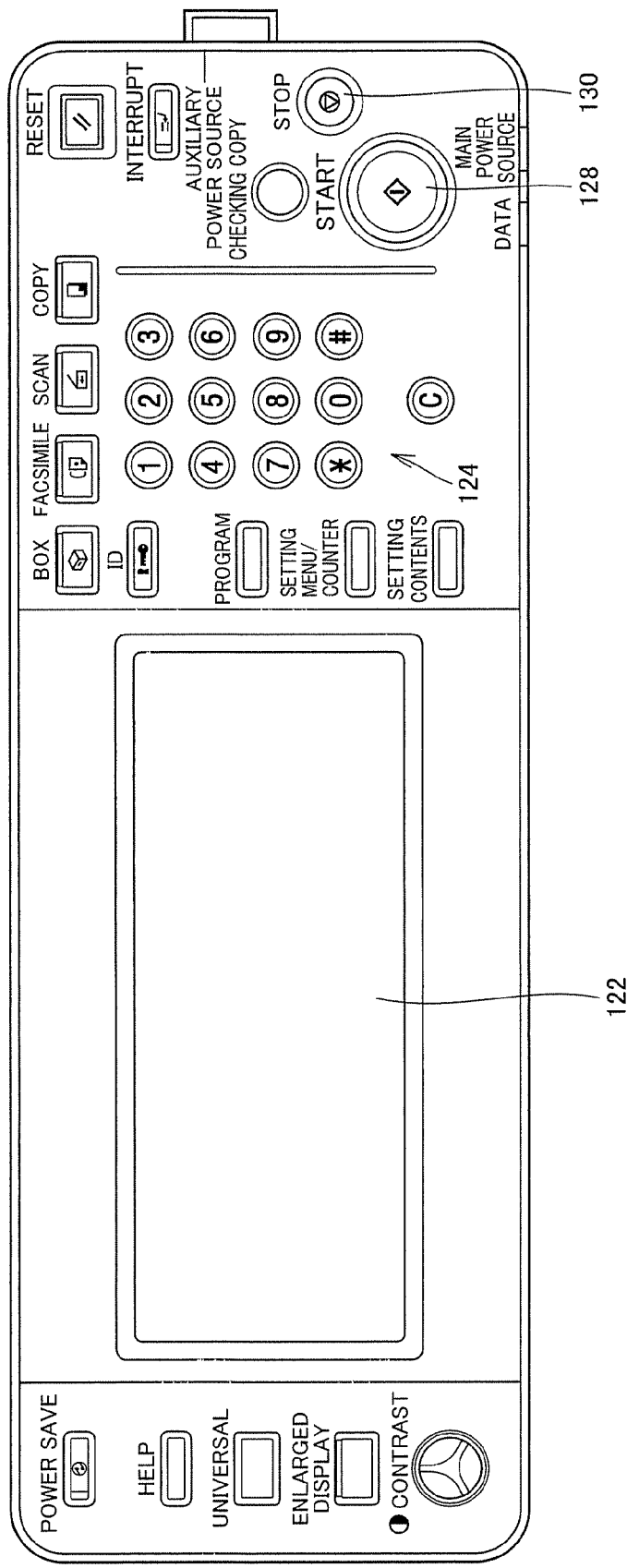
FIG. 3 is diagram showing a representative exterior appearance of an operation panel of the MFP according to Embodiment 1 of the present invention.

FIG. 3 shows a representative exterior appearance of operation panel 105 of MFP 1 according to Embodiment 1 of the present invention. Referring to FIG. 3, operation panel 105 includes a plurality of operation keys such as ten keys 124, a start key 128 and a stop key 130, and a touch panel 122.

When the user presses start key 128, a function having been selected in MFP 1 is executed, and when the user presses stop key 130, a function being executed is ceased or stopped.

Touch panel 122 includes a liquid crystal display (LCD) for displaying various types of information in MFP 1, and a pressure-sensitive panel that is arranged on the liquid crystal display and receives a user operation by sensing its pressure. Specifically, in touch panel 122, various types of information are displayed to the user, and buttons and icons for receiving respective operations to MFP 1 are displayed. When the pressure-sensitive panel senses that a user operation is performed in a position corresponding to any of the buttons, a command corresponding to that button is issued to CPU 101 (FIG. 2) and the like. Particularly, MFP 1 according to the present embodiment can display a preview image of the output image data on touch panel 122 prior to outputting the output image data.

Again, referring to FIG. 1, image scanner 106 scans image information from a document to generate input image data. Specifically, image scanner 106 irradiates light from a light source to the document placed on a platen glass, and receives the light reflected from the document by an image pickup element or the like to thereby obtain the image information of the document. Alternatively, image scanner 106 may include a document feeder tray, a delivery roller, a resist roller, a carrier drum, a paper discharge tray, and the like so as to enable successive document scanning. The input image data generated from the image information obtained by image scanner 106 is stored in hard disk 104 or the like.

In accordance with a user operation through operation panel 105, printer 107 prints out the input image data stored in hard disk 104 or the like, or the output image data generated by performing image processing in accordance with user setting to the input image data. Specifically, printer 107 includes a photoreceptor drum, a charger, an exposure unit, a developing unit, a transfer unit, a static eliminator, a fixing device, a cleaning device and the like, and these mechanisms operate in series to thereby provide print processing.

Network interface 108 provides data intercommunication with another MFP 1, personal computer or the like through network NW.

Now, an overview of operation from generation of the output image data from the input image data stored in hard disk 104 to output thereof is described. First, the user operates operation panel 105 to thereby provide user setting from operation panel 105 to CPU 101. In this user setting, specification of the input image to be subjected to image processing, contents of the image processing, and the like are included. In response to this user setting, CPU 101 reads out the specified input image data from hard disk 104, and performs the image processing to this read input image data in accordance with the user setting to generate the output image data. This output image data is temporarily stored in RAM 103.

At this time, when preview display is instructed by the user, CPU 101 displays a preview corresponding to the output image data on operation panel 105 prior to outputting the generated output image data (for example, prior to printing-out). Preview display denotes displaying an output image of the output image data, and generally, a resolution of the display is set to be lower than that of the output image data. The processing relating to this preview display will be described later. "Prior to outputting the output image data", the output image data may not be generated actually. Namely, the output image data may be generated after the preview display ends.

The user checks this preview display, and determines whether or not the corresponding output image data is to be outputted. When an instruction of image output is given by the user, CPU 101 outputs the output image data to printer 107 and the like.

<Configuration of Personal Computer>

FIG. 4 is a schematic configuration diagram of hardware of personal computer PC according to Embodiment 1 of the present invention. In personal computer PC, typically, a known operating system (OS) is installed.

Referring to FIG. 4, personal computer PC includes a CPU 201 that executes the operating system, and any application, a RAM (Random Access Memory) 203 that temporarily stores data necessary for the processing in CPU 201, and a hard disk 204 that stores the operating system and the program executed in CPU 201 in a nonvolatile manner. The program executed on personal computer PC is read from a CD-ROM (Compact Disk-Read Only Memory) 206a, a flexible disk (FD) 207a or the like, by a CD-ROM drive 206 or a flexible disk (FD) drive 207, respectively.

CPU 201 receives a command through an input unit 202 made up of a keyboard, a mouse and the like, and displays an output result obtained by the execution of the program, on a display 205. Moreover, CPU 201 can intercommunicate data with MFP 1 through a network interface 208 made up of a LAN card or the like. The respective units are interconnected through an internal bus 209.

The program for executing the image processing according to the present invention may be installed in personal computer PC to execute the program on personal computer PC. In this case, personal computer PC corresponds to the image processing apparatus according to the present invention.

<Image Synthesis Processing>

In MFP 1 according to Embodiment 1 of the present invention, as one example of the image processing, image synthesis processing of synthesizing another image data on the input image data to thereby generate the output image data is enabled. Hereinafter, this image synthesis processing is described. More specifically, as a representative example of the image synthesis processing, stamp processing of synthesizing accessory information of a document, a fixed pattern and the like in a predetermined printing position, and overlay processing of superimposing a plurality of pieces of image data to generate one piece of image data are described.

(1) Stamp Processing

The stamp processing is processing of specifying a printing position (synthesis area) within the input image data, and adding a textual image or a fixed pattern in the printing position to generate output image data. As one example of this textual image, a date/time, page number, numbering (serial number) and the like are included. As one example of the fixed pattern, "Urgent", "Confidential" and the like are included.

FIGS. 5A and 5B show output image data 10 in which a textual image 14 indicating a date/time is synthesized on input image data 12, as one example of a result of the stamp processing executed in MFP 1 according to Embodiment 1 of the present invention.

As enlarged in FIG. 5A, textual image 14 indicates "20 Sep. 2007" as the date, and "9:28 PM" as the time. The date/time indicated by textual image 14 may indicate a time and date when the output image is generated, or may indicate a time and date when the input image data is generated. Preferably, the contents of the date/time are configured so that the user can freely set them. Moreover, characters to be added may be selected from ones predetermined by the user, or may be freely inputted by the user.

As shown in FIG. 5B, textual image 14 as describe above is added to a header portion at the upper left of input image data 12 as one example. The printing position of this textual image 14 can be freely set by the user as will be described later.

Figure 6:
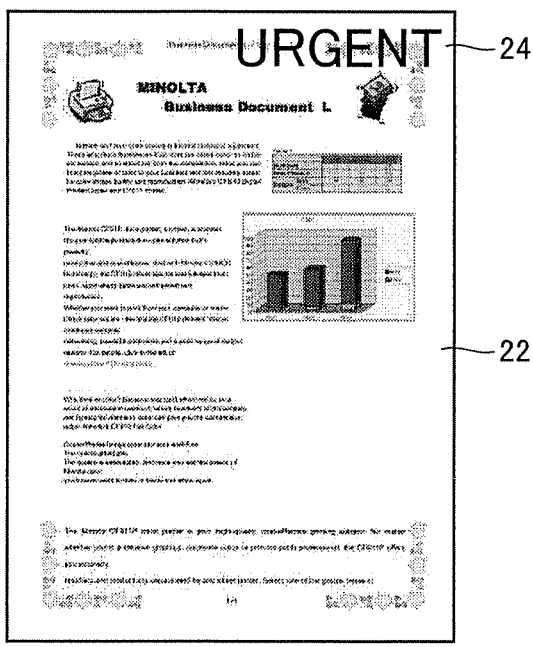
FIG. 6 is a diagram showing another example of a result of the stamp processing executed in the MFP according to Embodiment 1 of the present invention.

FIG. 6 shows output image data 20 in which a fixed pattern 24 is added to input image data 22, as another example of a result of the stamp processing executed in MFP 1 according to Embodiment 1 of the present invention.

As shown in FIG. 6, output image data 20 is obtained by adding fixed pattern 24 indicating "URGENT" at the upper right of input image data 22.

(2) Overlay Processing

The overlay processing is processing of superimposing a plurality of pieces of image data to generate one piece of image data, and in many cases, a plurality of pieces of input image data selected by the user are superimposed to generate one piece of output image data.

FIGS. 7A and 7B show processing of generating output image data 30 from input image data 32 scanned from a document, and input image data 34, which is a predefined form, as one example of a result of the overlay processing executed in MFP 1 according to Embodiment 1 of the present invention.

As shown in FIG. 7A, generally, the plurality of pieces of input image data used in the overlay processing have almost the same size as one another. By adding pixel information of corresponding pixels of both the pieces of input image data, the pixel information of the respective pixels making up the output image data is processed. This overlay processing generates output image data 30 as shown in FIG. 7B.

<Control Structure>

Figure 8:
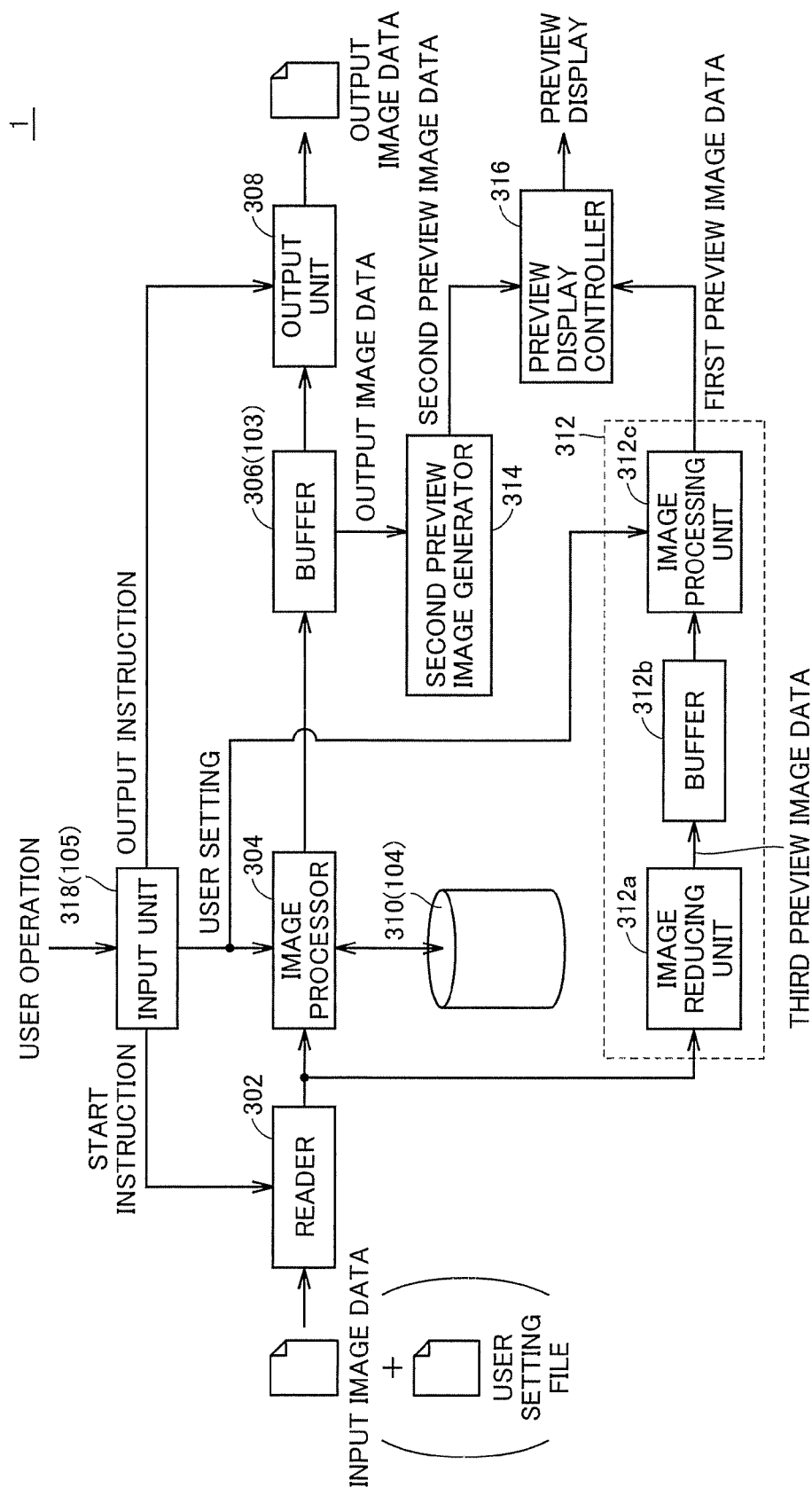
FIG. 8 is a block diagram showing a control structure in the MFP according to Embodiment 1 of the present invention.

Referring to FIG. 8, MFP 1 according to the present embodiment includes, as a control structure, a reader 302, an image processor 304, a buffer 306, an output unit 308, a pattern storage 310, a first preview image generator 312, a second preview image generator 314, a preview display controller 316, and an input unit 318. In this control structure, buffer 306 is typically implemented by allocating a specific area of RAM 103, and pattern storage 310 is implemented by allocating a specific area of hard disk 104. The other units are typically implemented by CPU 101 executing a control program. All or some included in the control structure may be implemented by hardware.

Input unit 318 outputs a corresponding internal command to a corresponding unit in accordance with an operation (user operation) of operation panel 105 (FIGS. 2 and 3) by the user. Specifically, input unit 318 outputs a start instruction to reader 302 in accordance with the user operation, outputs user setting to image processor 304 and first preview image generator 312, and outputs an output instruction to output unit 308.

Reader 302, in response to the start instruction from input unit 318, selectively reads out a specified one from input image data stored in hard disk 104 (FIG. 2). The source from which reader 302 reads out the input image data is not limited to hard disk 104. Moreover, when the above-described overlay processing is instructed, reader 302 reads out a plurality of pieces of input image data. Reader 302 then outputs the read one or plurality of pieces of input image data to image processor 304 and first preview image generator 312.

Upon receiving the input image data from reader 302, image processor 304 performs image processing (image synthesis processing) in accordance with the user setting received from input unit 318 to generate the output image data. When the synthesis of a fixed pattern is instructed in the user setting, the necessary fixed pattern is obtained from pattern storage 310.

Pattern storage 310 has stored one or a plurality of fixed patterns in advance, and responds to a request from image processor 304 with the necessary fixed pattern.

The output image data generated in image processor 304 is temporarily stored in buffer 306.

Output unit 308 outputs the output image data stored in buffer 306 to printer 107 (FIG. 2) or the like in response to an output instruction from input unit 318.

Meanwhile, first preview image generator 312, second preview image generator 314 and preview display controller 316 operate so as to display a preview screen of the output image data on operation panel 105 (FIGS. 2 and 3) when the preview display is instructed by the user.

Second preview image generator 314 generates preview image data from the output image data stored in buffer 306. The preview image data generated by this second preview image generator 314 is for simply displaying an output image, and an image size thereof is smaller than that of the output image data. This preview image can be generated only after the output image data is generated by image processor 304.

Meanwhile, first preview image generator 312 generates a preview image by reducing the input image data read out by reader 302. This preview image generated by first preview image generator 312 is tentatively displayed on operation panel 105 until the generation of the preview image by second preview image generator 314 has been completed.

Namely, on operation panel 105, the preview display based on the preview image data generated by first preview image generator 312 (first stage) is provided, and then, the preview display based on the preview image data generated by second preview image generator 314 (second stage) is provided. Hereinafter, the preview image generated by first preview image generator 312 is also referred to as a "first preview image", and the preview image generated by second preview image generator 314 is also referred to as a "second preview image".

More specifically, first preview image generator 312 includes an image reducing unit 312a, a buffer 312b, and an image processing unit 312c. Image reducing unit 312a reduces the input image data to generate third preview image data that has an image size appropriate for the preview image. This third preview image data generated by image reducing unit 312a is temporarily stored in buffer 312b.

When the image synthesis processing is set as the user setting, image processing unit 312c, in accordance with the user setting, changes a screen appearance of at least a portion of an area on the third preview image data corresponding to an area on the input image data in which another image data (the fixed pattern or the like) is to be synthesized. Image processing unit 312c outputs the third preview image data in which the screen appearance of the object area has been changed is outputted as the first preview image data.

In this change processing of the screen appearance, image processing unit 312c specifies the area on the input image data to be subjected to the image synthesis processing, based on a type, a size, a printing position and the like of the pattern to be synthesized, which are included in the user setting. Image processing unit 312c specifies the area on the third preview image data corresponding to this specified area to change the screen appearance for all or a portion thereof.

In this manner, first preview image generator 312 generates the preview image having the screen appearance enabling identification as to which area of the input image is to be subjected to the synthesis processing, until the second preview image data is generated by second preview image generator 314. Such processing relating to the generation of the first preview image data in first preview image generator 312 is made simpler than the image synthesis processing in image processor 304, which enables quick preview display without making the user feel stress.

Preview display controller 316, when the first preview image data is generated by first preview image generator 312, displays the preview on operation panel 105 based on the first preview image data. Subsequently to this image, when second preview image generator 314 generates the second preview image data, preview display controller 316 updates the display on operation panel 105 with the preview display based on the second preview image data.

If the image synthesis processing is not set as the user setting, and when the preview display is instructed by the user, image processing unit 312c outputs the third preview image data as the first preview image as it is without performing the change processing of screen appearance for the third preview image data. At this time, second preview image generator 314 does not generate the second preview image data.

<Preview Display>

Figure 9:
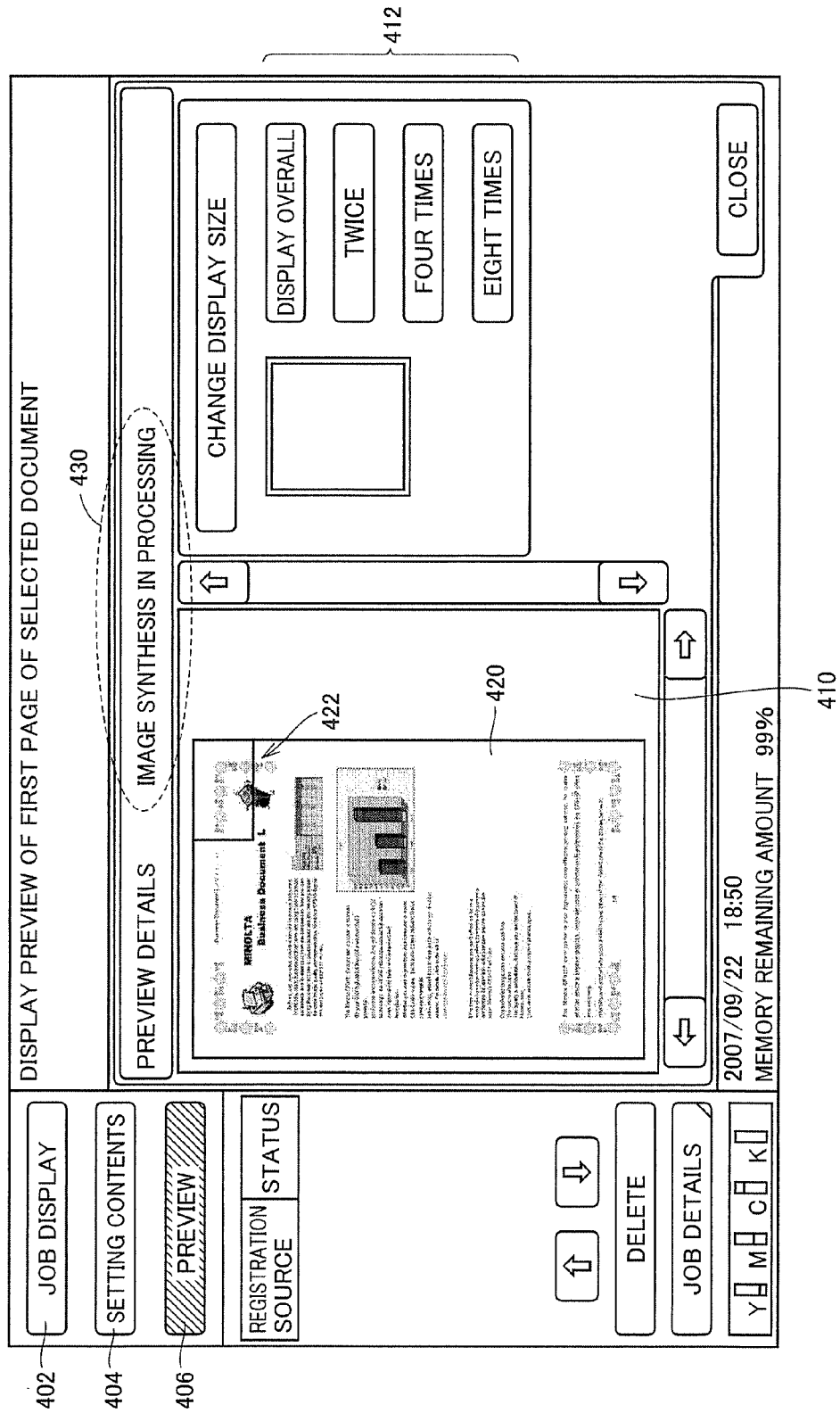
FIG. 9 is a diagram showing a screen example of a first stage of preview display according to Embodiment 1 of the present invention.
Figure 10:
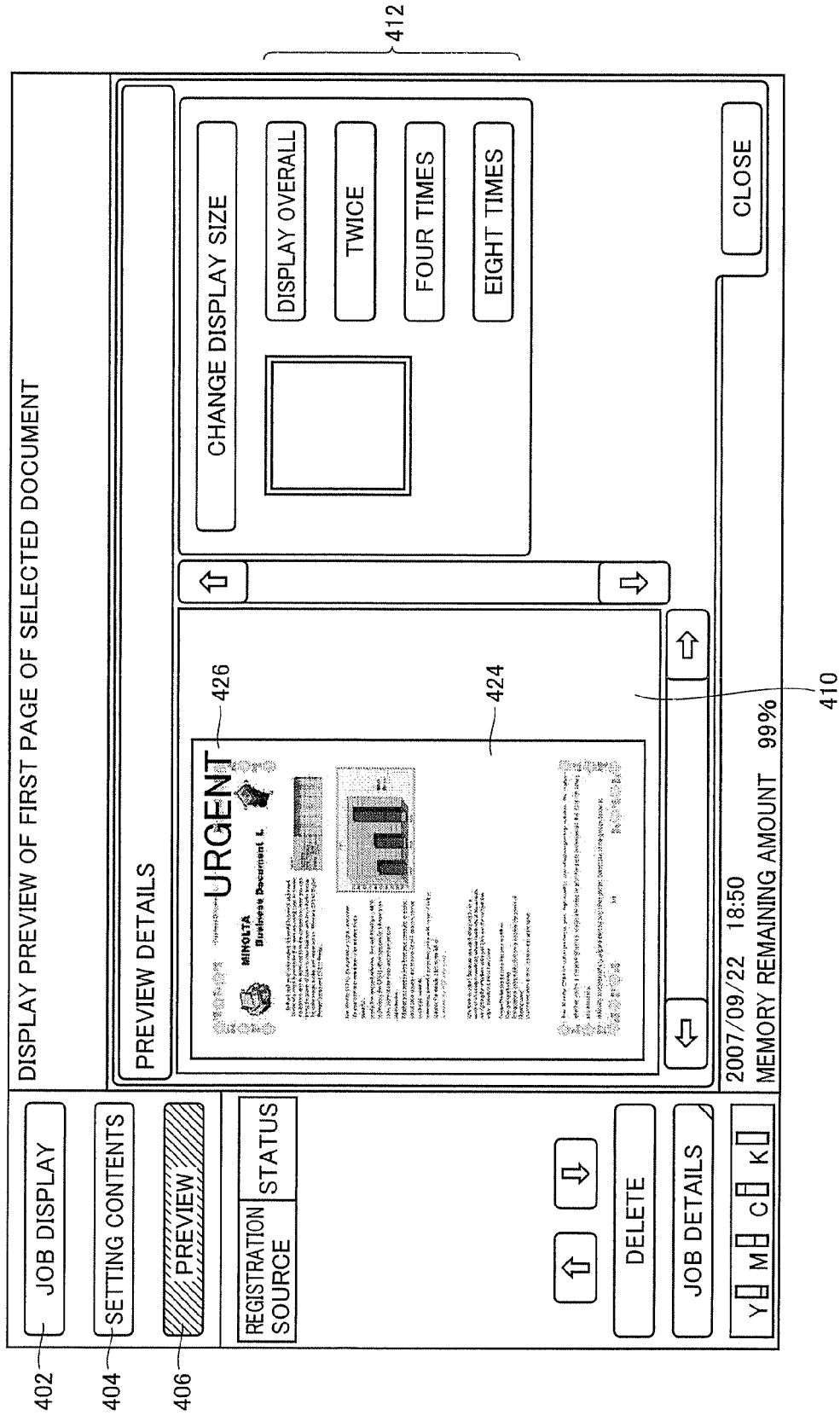
FIG. 10 is a diagram showing a screen example of a second stage of preview display according to Embodiment 1 of the present invention.

Hereinafter, referring to FIGS. 9 and 10, an example of the preview display is described. In FIGS. 9 and 10, preview display when the stamp processing shown in FIG. 6 is executed is illustrated as one example of the image synthesis processing according to the user setting.

FIG. 9 shows a display example of the preview image based on the first preview image data, and FIG. 10 shows a display example of the preview image based on the second preview image data.

Preview display controller 316 (FIG. 8) causes a preview window as shown in FIGS. 9 and 10 to be displayed on operation panel 105 (FIGS. 2 and 3). A job display button 402, a setting contents button 404, a preview button 406 and the like are arranged to the left side of this preview window. When job display button 402 and setting contents button 404 is pressed by the user, the display contents of operation panel 105 are changed to a job display window and a setting contents window not shown, respectively. In this job display window, jobs in processing or waiting for processing in MFP 1 are displayed in a list. In the setting contents window, as will be described later, change of various types of the user setting is acceptable. The preview window shown in FIGS. 9 and 10 is also displayed by pressing preview button 406 while another window is being displayed.

As shown in FIGS. 9 and 10, in the preview window, a preview display area 410 is provided, and a preview image is displayed within this preview display area 410. A button group 412 for changing a size of the preview image displayed in preview display area 410 is arranged to the right side of preview display area 410. When any button of button group 412 is pressed, preview display controller 316 (FIG. 8) enlarges or reduces the preview image, corresponding to the button.

Referring to FIG. 9, when the user first presses preview button 406, the preview image based on the first preview image data generated by first preview image generator 312 (FIG. 8) is displayed. As described above, in the first preview image data, the screen appearance of at least a portion of the area corresponding to the area on the input image data in which another image data (fixed pattern or the like) is to be synthesized is changed. As one example of the above-described change of the screen appearance, FIG. 9 shows a preview image 420 in which a frame 422 indicating the area where the fixed pattern is to be synthesized is added.

On the other hand, after displaying the preview as shown in FIG. 9, image processor 304 (FIG. 8) generates the output image data from the input image data, and second preview image generator 314 (FIG. 8) generates the second preview image data from the output data. When the generation of the second preview image data has been completed, the display on operation panel 105 is switched from the preview display shown in FIG. 9 to the preview display shown in FIG. 10.

Referring to FIG. 10, in preview display area 410, a preview image 424 in which a fixed pattern 426 of "Urgent" has been synthesized on the input image is displayed.

Moreover, after preview image 420 is displayed based on the first preview image data (FIG. 9), preview display controller 316 displays a message 430 of "IMAGE SYNTHESIS IN PROCESSING" indicating that the second preview image data is being generated until the display is switched to the display of preview image 424 based on the second preview image data (FIG. 10).

As described above, if the user instructs the preview display, preview image 420 in which frame 422 indicating the area where the fixed pattern is to be synthesized is added to the input image is quickly displayed, and subsequently, preview image 424 corresponding to the output image data in which the fixed pattern has been synthesized is displayed Thus, the user can check final output without feeling stress due to the time required for the image processing.

<First Preview Image>

In FIG. 9, the processing for generating the first preview image data in which the frame indicating the area to be synthesized is added has been described. Hereinafter, referring to FIGS. 11A to 11C, variation of the processing for generating the above-described first preview image data is illustrated.

Figure 11A:
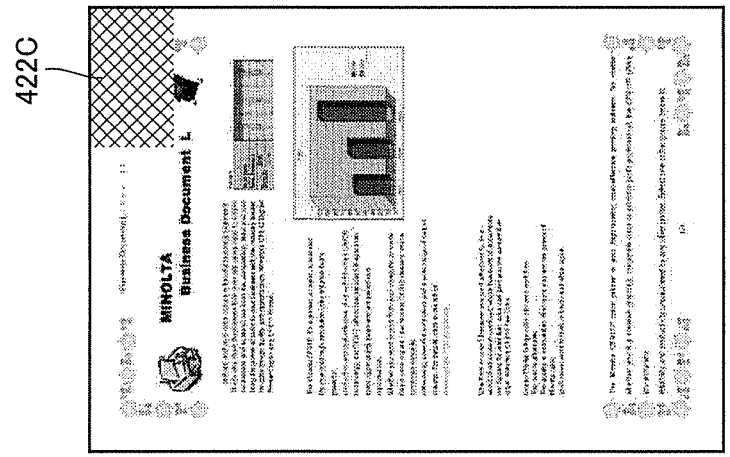
FIGS. 11A to 11C are diagrams showing a generation processing example of first preview image data according to Embodiment 1 of the present invention.

FIG. 11A shows the first preview image data in which a frame 422A indicating the area to be synthesized is added. A size, a shape, a printing position and the like of this frame 422A are changed as needed by first preview image generator 312 in accordance with the fixed pattern to be synthesized.

Figure 11B:
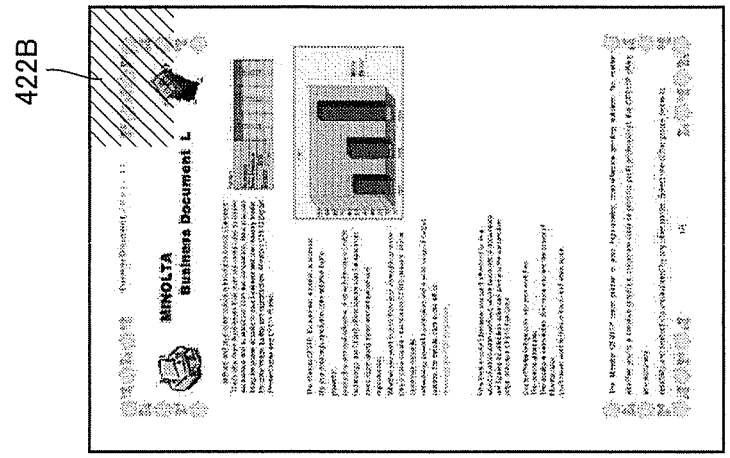

FIG. 11B shows the first preview image data in which characteristic values of pixels included in an area 422B to be synthesized are changed. Specifically, the first preview image data is changed in color information such as lightness, luminance, hue and the like of the pixels included in area 422B in accordance with a predetermined rule. Typically, the first preview image data in which the lightness of the pixels included in area 422B is increased is generated.

Figure 11C:
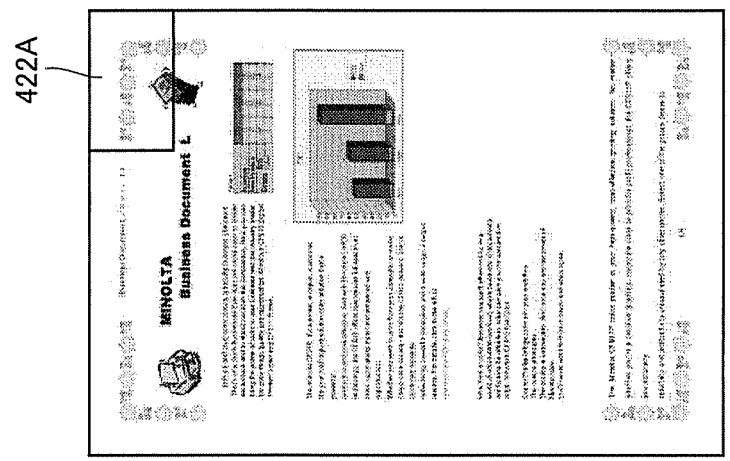

FIG. 11C shows the first preview image data in which an area 422C to be synthesized is replaced by a predetermined pattern image. Specifically, in the first preview image data, the predetermined pattern stored in advance is read out, and area 422C is replaced by the predetermined pattern.

<User Setting Relating to Image Synthesis Processing>

Figure 12:
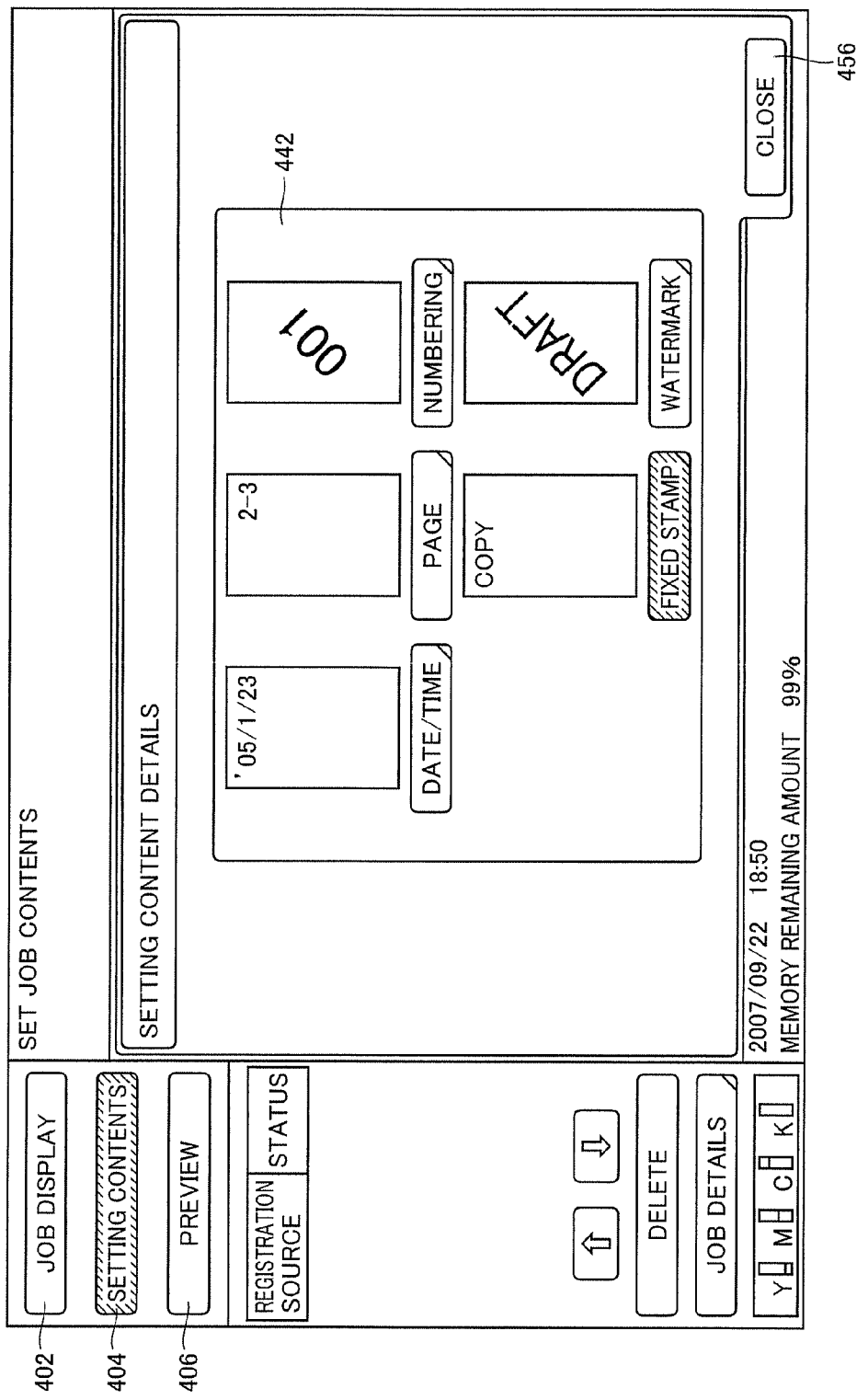
FIG. 12 is a diagram showing a first screen example for performing setting relating to image synthesis processing in the MFP according to Embodiment 1 of the present invention.
Figure 13:
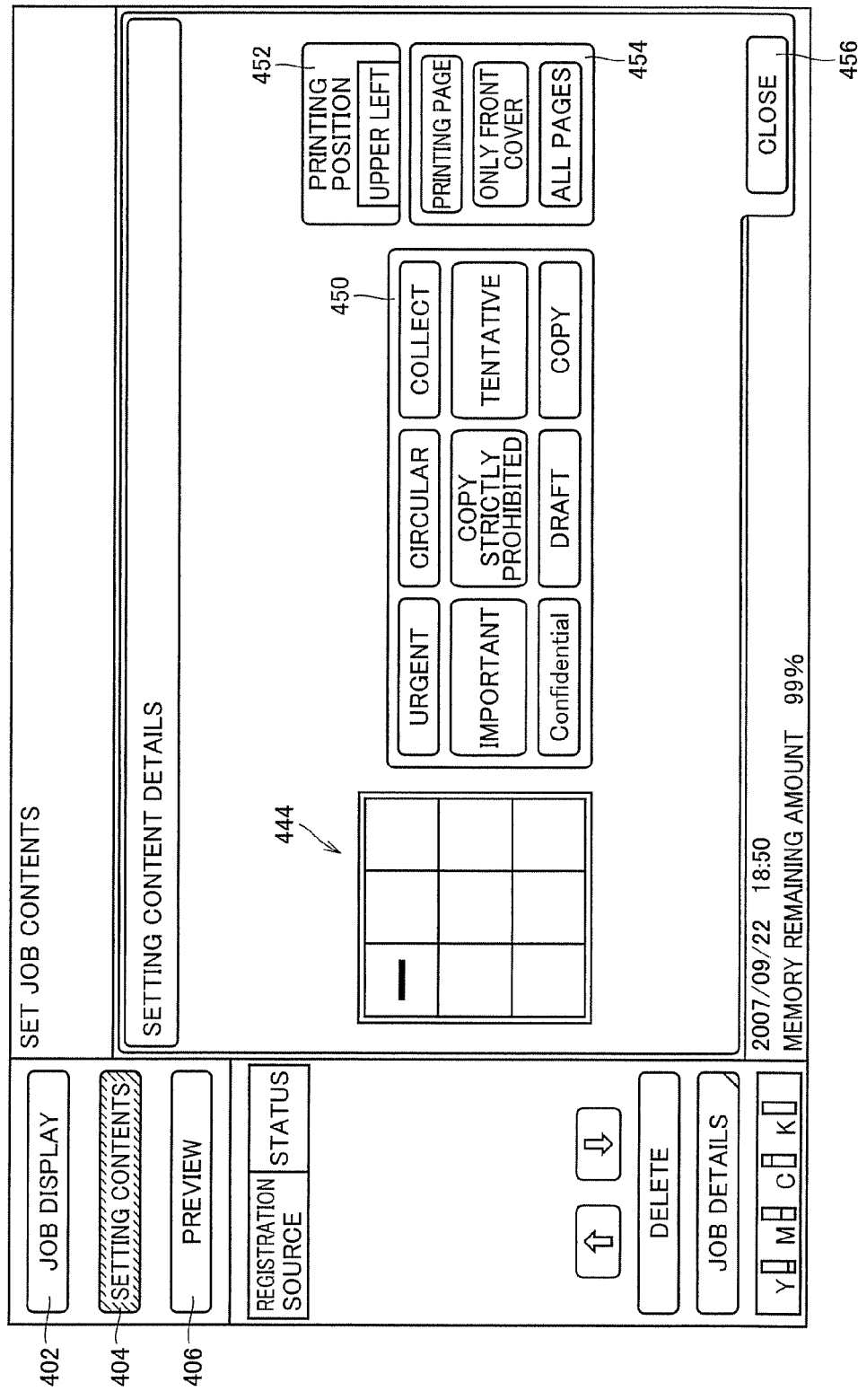
FIG. 13 is a diagram showing a second screen example for performing setting relating to the image synthesis processing in the MFP according to Embodiment 1 of the present invention.
Figure 14:
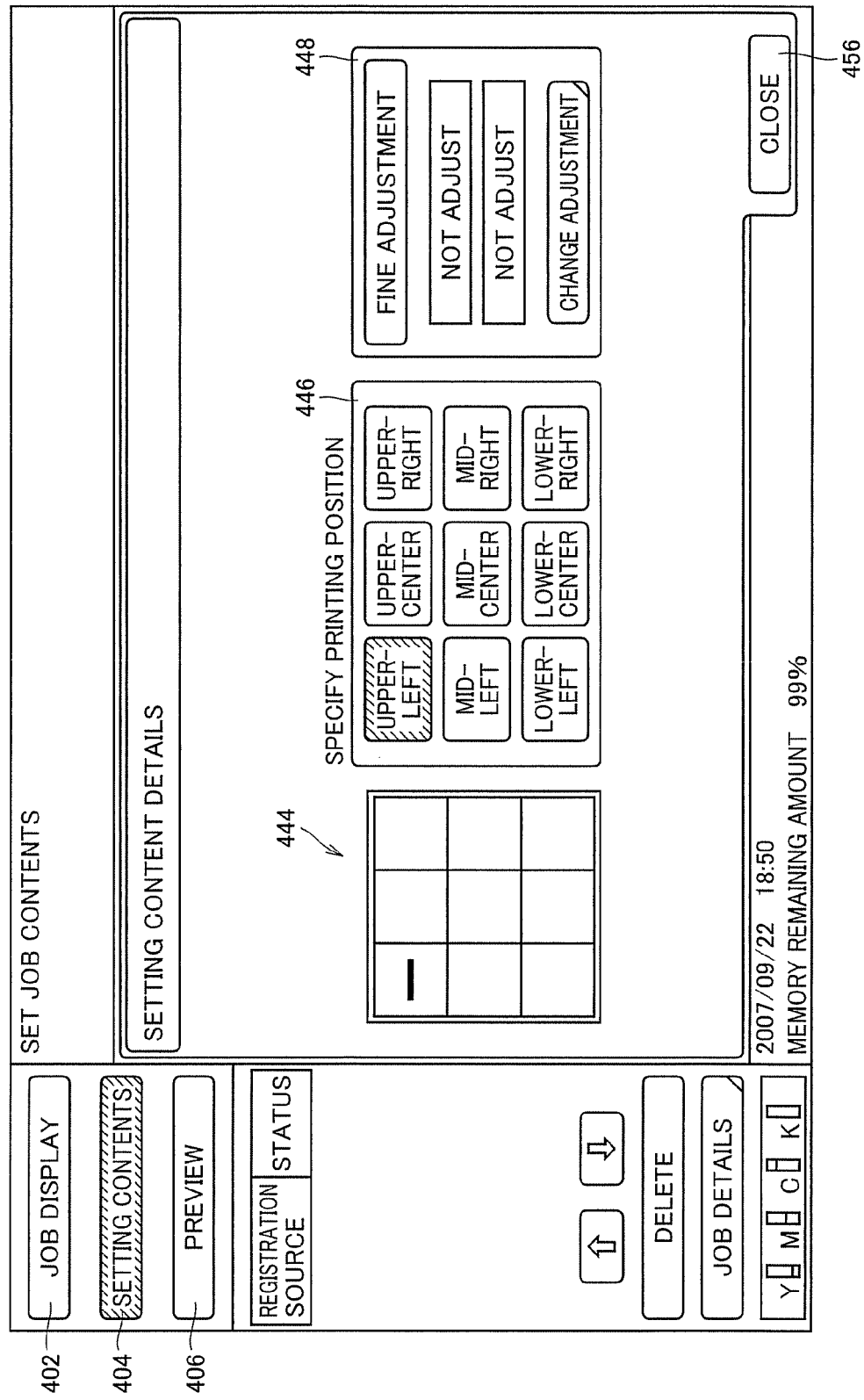
FIG. 14 is a diagram showing a third screen example for performing setting relating to the image synthesis processing in the MFP according to Embodiment 1 of the present invention.

After the above-described preview display as shown in FIGS. 9 and 10, and/or prior to the preview display, the user can also perform setting relating to the image processing (image synthesis processing). Referring to FIGS. 12 to 14, such a setting method relating to the image synthesis processing is illustrated.

FIG. 12 shows a first screen example for performing the setting relating to the image synthesis processing in MFP 1 according to Embodiment 1 of the present invention. FIG. 13 shows a second screen example for performing the setting relating to the image synthesis processing in MFP 1 according to Embodiment 1 of the present invention. FIG. 14 shows a third screen example for performing the setting relating to the image synthesis processing in MFP 1 according to Embodiment 1 of the present invention.

When the user presses setting contents button 404 in the preview window (FIG. 10), the display contents on operation panel 105 are switched to a setting window as shown in FIG. 12. Before displaying the setting window shown in FIG. 12, a setting window for selecting a desired one from a plurality of types of image processing including the image synthesis processing may be displayed.

In the setting window shown in FIG. 12, a list display area 442 is arranged so that the user can select a desired one from the plurality of types of image synthesis processing. In this list display area 442, processing contents executable as the image synthesis processing are displayed in a list. More specifically, in list display area 442, there are arranged a "DATE/TIME" button for adding a date/time to the input image data, a "PAGE" button for adding a page number to the input image data, a "NUMBERING" button for adding a serial number to the image input data, a "FIXED STAMP" button for adding a fixed pattern to the input image data, a "WATERMARK" button for adding a background pattern to the input image data and the like.

When the user setting has been already made (as one example, in the image synthesize of the fixed pattern as shown in FIG. 10), the corresponding button (in this case, the "FIXED STAMP" button) may be displayed so as to be differentiated from the other buttons in the screen appearance.

When the user presses the "FIXED STAMP" button in this setting window shown in FIG. 12, the display contents on operation panel 105 are switched to a setting window as shown in FIG. 13.

The setting window shown in FIG. 13 is for setting more detailed contents of the "FIXED STAMP" processing. Specifically, in the setting window shown in FIG. 13, printing-position display areas 444 and 452, and list display areas 450 and 454 are arranged. In printing-position display area 444, a total of nine areas resulting from vertically dividing the printing area into three and horizontally dividing the same into three are displayed graphically, and an indicator is displayed in an area corresponding to a position set by the user for synthesizing the fixed stamp among these nine areas. Moreover, in printing-position display area 452, the position set by the user for synthesizing the fixed stamp is displayed in a text.

In list display area 450, fixed patterns selectable in the "FIXED STAMP" processing are displayed in a list. Moreover, in list display area 454 is displayed a button for selecting an object page on which the selected pattern is to be printed. More specifically, in list display area 454, there are arranged an "ONLY FRONT COVER" button for setting printing of the fixed stamp only on a first page of the input image data, and an "ALL PAGES" button for setting printing of the fixed stamp on all pages of the input image data.

When the user presses printing-position display area 444 or printing-position display area 452 in the setting window shown in FIG. 13, the display contents on operation panel 105 are switched to a setting window as shown in FIG. 14.

The setting window shown in FIG. 14 is for setting the printing position of the fixed stamp. Specifically, in the setting window shown in FIG. 14, printing-position display area 444, a printing-position specifying area 446, and a fine-adjustment display area 448 are arranged. Printing-position display area 444 is similar to that displayed in the setting window in FIG. 13. In printing-position specifying area 446, nine printing positions are selectably displayed in a list, corresponding to the nine areas displayed graphically in printing-position display area 444.

Moreover, in fine-adjustment display area 448, statuses of the fine adjustment to any of the areas selected in printing-position specifying area 446 (e.g., "upper left") are displayed. Moreover, in fine-adjustment display area 448, an "adjustment change" button for selecting a setting window (not shown) for performing the above-described fine adjustment is also displayed.

The user can perform the setting relating to the image synthesizing processing by performing a desired operation to the setting window as shown in FIGS. 12 to 14. The user presses a "close" button 456 to thereby reflect the setting contents.

<User Setting File>

The contents set by the user on the setting windows as shown in FIGS. 12 to 14 are outputted to image processor 304 (FIG. 8) and the like through input unit 318 (FIG. 8). These contents of the user setting may be temporarily stored in RAM 103 (FIG. 2) or may be stored in hard disk 104 (FIG. 2) as a file (user setting file).

In a case where the user setting file is stored in hard disk 104, the file is preferably associated with the input image data to which the user setting is applied. This configuration allows the corresponding user setting file to be read out together with the input image data, when the user selects the input image data of interest.

Figure 15:
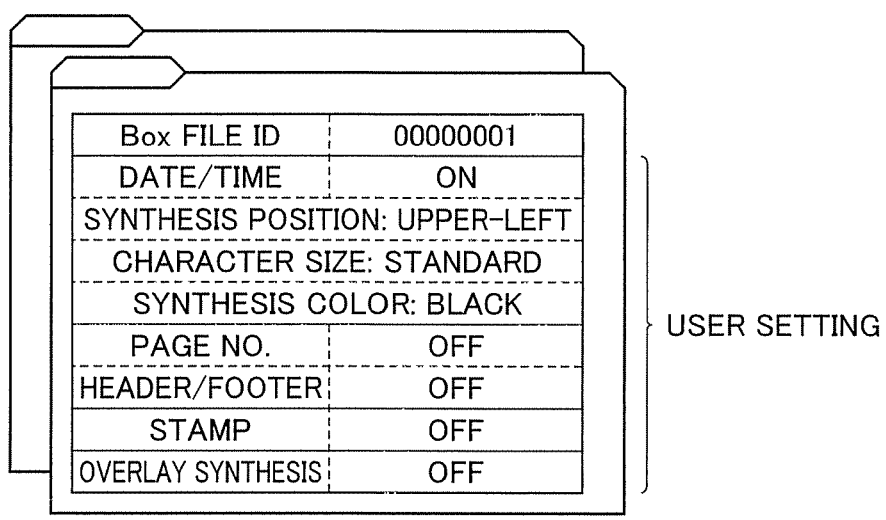
FIG. 15 is a diagram showing one example of contents of a user setting file stored in the MFP according to Embodiment 1 of the present invention.

FIG. 15 shows one example of the contents of the user setting file stored in MFP 1 according to Embodiment 1 of the present invention.

Referring to FIG. 15, a "BOX FILE ID" for specifying the associated input image data is defined in the user setting file. Moreover, in the user setting file, items such as a "DATE/TIME", "PAGE NUMBER", "HEADER/FOOTER", "STAMP", "OVERLAY SYNTHESIS" and the like are provided for specifying requirement for the respective processing items.

In the user setting file shown in FIG. 15, since the "DATE/TIME" is "ON", items for specifying more detailed contents of the synthesis processing of the date/time, such as a "SYNTHESIS POSITION", a "CHARACTER SIZE", a "SYNTHESIS COLOR" and the like, are further provided.

The above-described contents of the user setting file may be set by another apparatus such as personal computer PC, besides the embodiment in which the user operates operation panel 105 to set them. Typically, on a document creating application executed by personal computer PC, the above-described user setting file may be outputted concurrently with the creation of the input image data from a document. At this time, the contents of the user setting file can be set on a printer driver installed in personal computer PC.

Alternatively, a Web-based user interface may be provided. In this case, CPU 101 of MFP 1 executes a program for providing a Web server, and this Web server provides a Web-based interface for receiving the user setting on a browser application on personal computer PC connected through network.

<Regeneration Processing of Preview Image>

When the user checks the preview image as shown in FIG. 10, and then, performs operations to the setting windows as shown in FIGS. 12 to 14 to change the user setting relating to the image synthesis processing, a preview image is regenerated.

Again, referring to FIG. 8, when the user setting is changed, first preview image generator 312 regenerates the first preview image data based on the input image data. On the other hand, image processor 304 also performs the image processing in accordance with the user setting after the change to regenerate the output image data. Furthermore, second preview image generator 314 regenerates the second preview image data from this regenerated output image data. Thus, the preview images as shown in FIG. 9 and FIG. 10 are redisplayed based on the first and second preview image data generated by first and second preview image generators 312 and 314, respectively.

In this manner, since the preview image after setting change is quickly displayed on operation panel 105, the user can set the contents of the desired image synthesis processing while checking the final output.

<Overall Processing>

Figure 16:
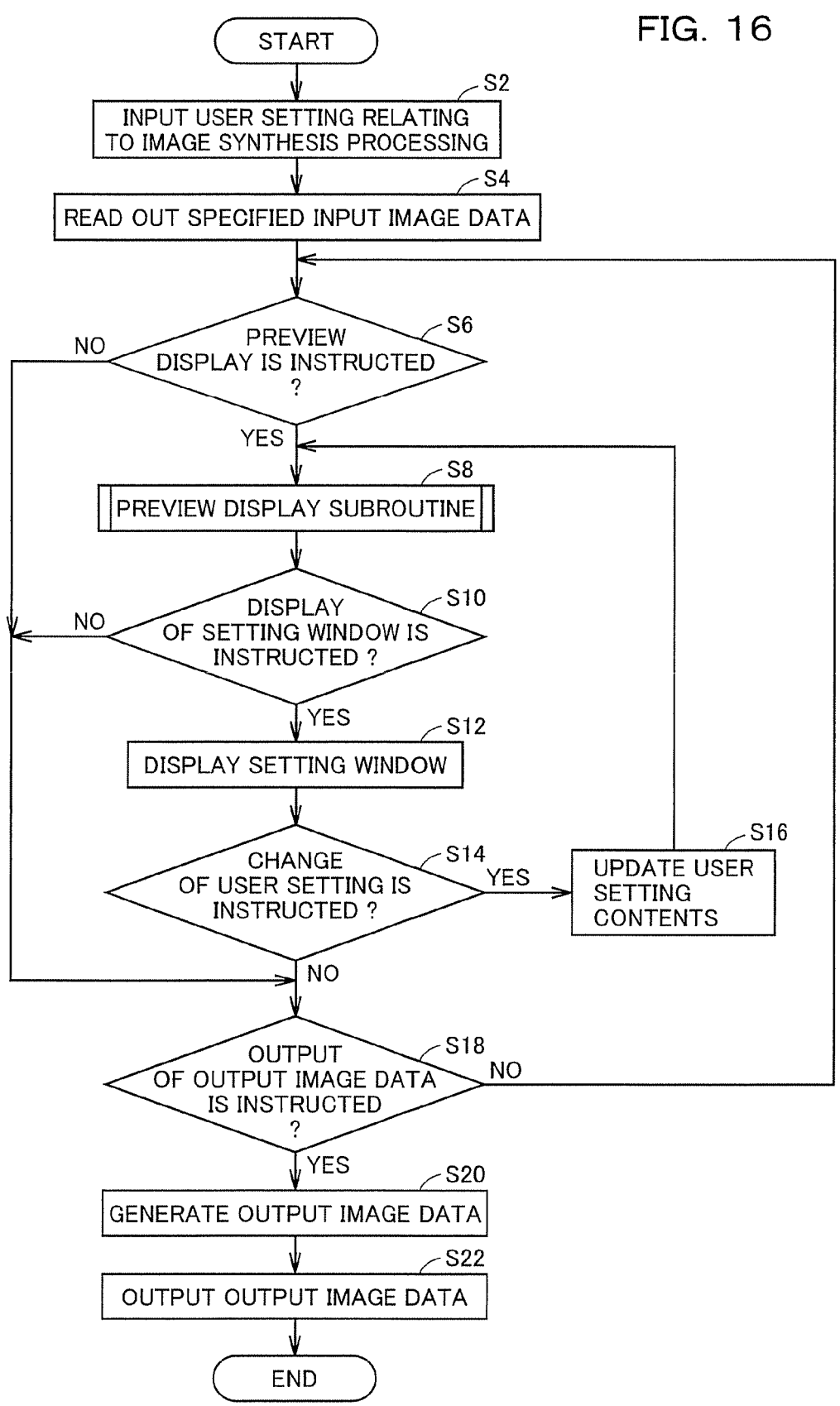
FIG. 16 is a flowchart showing overall processing in the MFP according to Embodiment 1 of the present invention.

Next, referring to FIGS. 2, 8 and 16, overall processing relating to the above-described image synthesis processing is described.

A user who will perform some image synthesis processing to an input image data to output output image data operates operation panel 105 to select an input image as an object, and inputs user setting relating to the image synthesis processing (step S2). This user setting is stored in RAM 103, hard disk 104 or the like.

After inputting the user setting, when the user presses start key 128 on operation panel 105, input unit 318 outputs a start instruction to CPU 101 functioning as reader 302. In response to this start instruction, CPU 101 functioning as reader 302 reads out the specified input image data from hard disk 104 (step S4). If a user setting file is stored in hard disk 104 in advance, CPU 101 also reads out the user setting file corresponding to the input image data together with the specified input image data.

Subsequently, CPU 101 determines whether or not the preview display is instructed by the user (step S6). If the preview display is instructed (in a case of YES in step S6), CPU 101 executes a preview display subroutine (step S8) to display a preview image on operation panel 105. After the execution of this preview display subroutine, CPU 101 determines whether or not the display of the setting windows is instructed by the user (step S10).

If the display of the setting window is instructed by the user (in a case of YES in step S10), CPU 101 displays the setting windows as shown in FIGS. 12 to 14 (step S12). Furthermore, CPU 101 determines whether or not change of the user setting is instructed on any of the setting windows (step S14).

If any change of the user setting is instructed on the setting window (in a case of YES in step S14), CPU 101 reflects the change contents on the user setting stored in RAM 103 or the like to update the contents of the user setting (step S16). CPU 101 again executes the preview display subroutine based on the changed setting (step S8) to update the preview image on operation panel 105.

On the other hand, if the preview display is not instructed (in a case of NO in step S6), if the display of the setting window is not instructed (in a case of NO in step S10), or if the change of the user setting is not instructed on the setting window (in a case of NO in step S14), CPU 101 determines whether or not the output of the output image data is instructed (step S18).

If the output of the output image data is instructed (in a case of YES in step S18), CPU 101 functioning as image processor 304 performs the image processing (image synthesis processing) to the input image data read out in step S4 in accordance with the user setting to generate the output image data (step S20). This output image data is stored in RAM 103 functioning as buffer 306. Subsequently, CPU 101 functioning as output unit 308 outputs the output image data generated in step S12 (step S22). Then, a series of processing ends. If the output image data has been already generated for displaying the preview image, the processing in step S20 may be skipped.

On the other hand, if the output of the output image data is not instructed (in a case of NO in step S18), CPU 101 repeatedly executes the processing in step S6 and later.

<Preview Display Processing>

Figure 17:
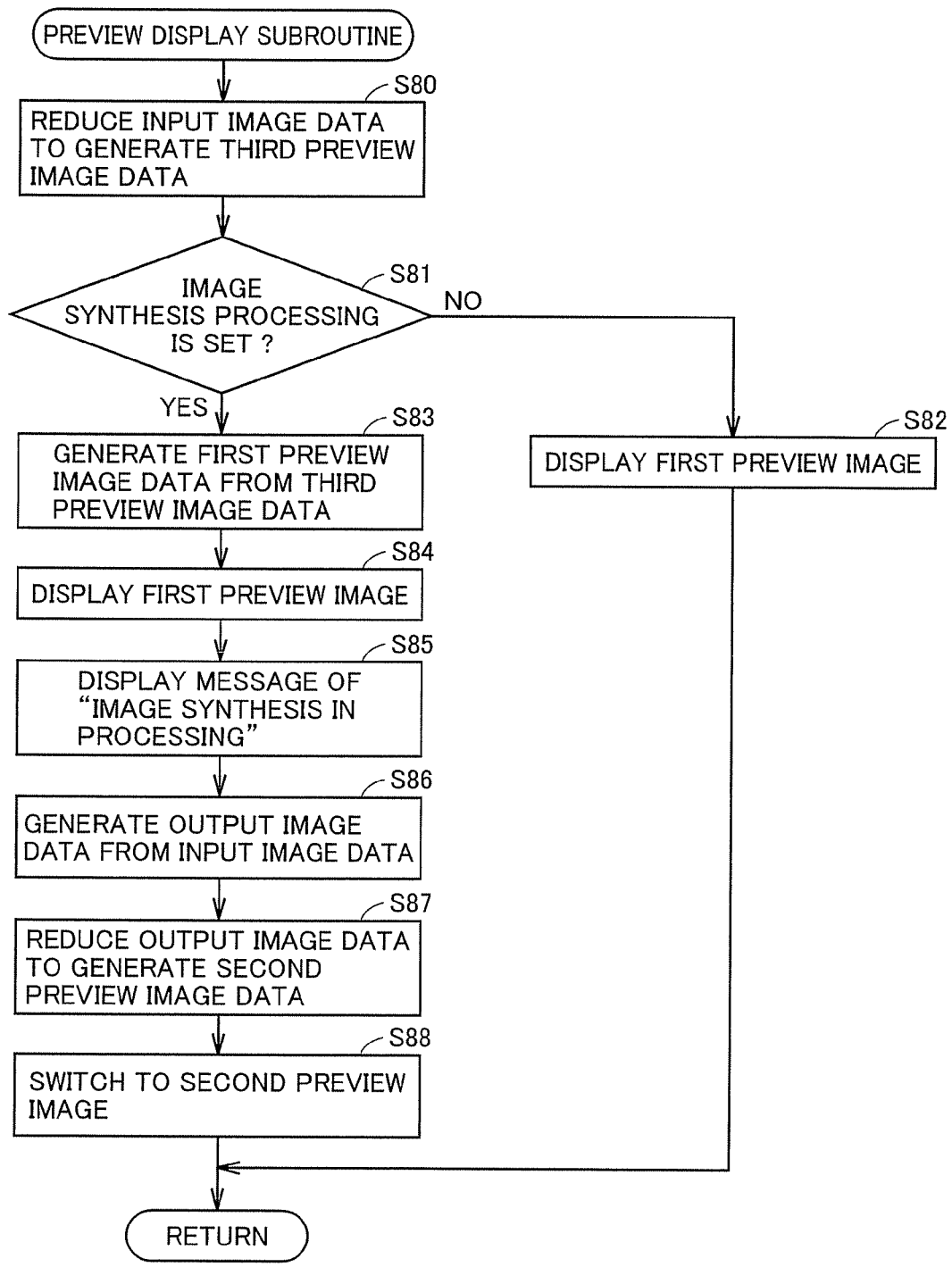
FIG. 17 is a flowchart showing processing of a preview display subroutine (step S8) shown in FIG. 16.

Referring to FIGS. 2, 8 and 17, CPU 101 functioning as image reducing unit 312*a* reduces the input image data read out in step S4 in FIG. 16 to generate the third preview image data (step S80). This third preview image data is stored in RAM 103 functioning as buffer 312*b*. Subsequently, CPU 101 functioning as image processing unit 312*c* determines whether or not the image synthesis processing is set as the user setting (step S81).

If the image synthesis processing is not set as the user setting (in a case of NO in step S81), CPU 101 functioning as image processing unit 312*c* outputs the third preview image data stored in RAM 103 as the first preview image data. CPU 101 functioning as preview display controller 316 displays the first preview image on operation panel 105 based on this first preview image data (the same as the third preview image data) (step S82). Then, the preview display subroutine ends, and the processing returns to step S10 in FIG. 16.

On the other hand, if the image synthesis processing is set as the user setting (in a case of YES in step S81), CPU 101 functioning as image processing unit 312*c* changes the screen appearance of a predetermined area of the third preview image data based on the contents of the user setting to generate the first preview image data (step S83). CPU 101 functioning as preview display controller 316 then displays the first preview image on operation panel 105 based on this first preview image data (step S84). Furthermore, CPU 101 displays the message of "IMAGE SYNTHESIS IN PROCESSING" on operation panel 105 (step S85).

Subsequently, CPU 101 functioning as image processor 304 performs the image processing (image synthesis processing) to the input image data read out in step S4 in FIG. 16, in accordance with the user setting to generate the output image data (step S86). This output image data is stored in RAM 103 functioning as buffer 306.

Furthermore, CPU 101 functioning as second preview image generator 314 reduces the output image data generated in step S85 to generate second preview image data (step S87). CPU 101 functioning as preview display controller 316 switches the display on operation panel 105 from the first preview image based on the first preview image data to the second preview image based on the second preview image data (step S88). At this time, CPU 101 makes the message of "IMAGE SYNTHESIS IN PROCESSING" on operation panel 105 undisplayed.

This ends the preview display subroutine, and the processing returns to step S10 in FIG. 16.

<Functional Effect in the Present Embodiment>

According to Embodiment 1 of the present invention, in the preview display of the output image data, the preview image based on the first preview image data generated from the input image data is first displayed quickly, and subsequently to this image, the preview image based on the second preview image data generated from the output image data is displayed. This can alleviate stress that the user feels due to time required for the preview display.

Moreover, according to Embodiment 1 of the present invention, since in the first preview image data, the frame indicating an area to be subjected to the image synthesis, and the like are added, the user can, in advance, visually confirm the area where a fixed pattern or the like is synthesized. Thus, the user can quickly set the contents of the desired image synthesis processing while checking the final output.

Modification of Embodiment 1

As a modification of Embodiment 1 of the present invention, a configuration in which the generation processing of the second preview image data corresponding to the output image data is modified is illustrated. Basically, configurations other than the configuration relating to the generation of the second preview image data are similar to those of the above-described Embodiment 1, and thus, a detailed description thereof is not repeated.

<Control Structure>

Figure 18:
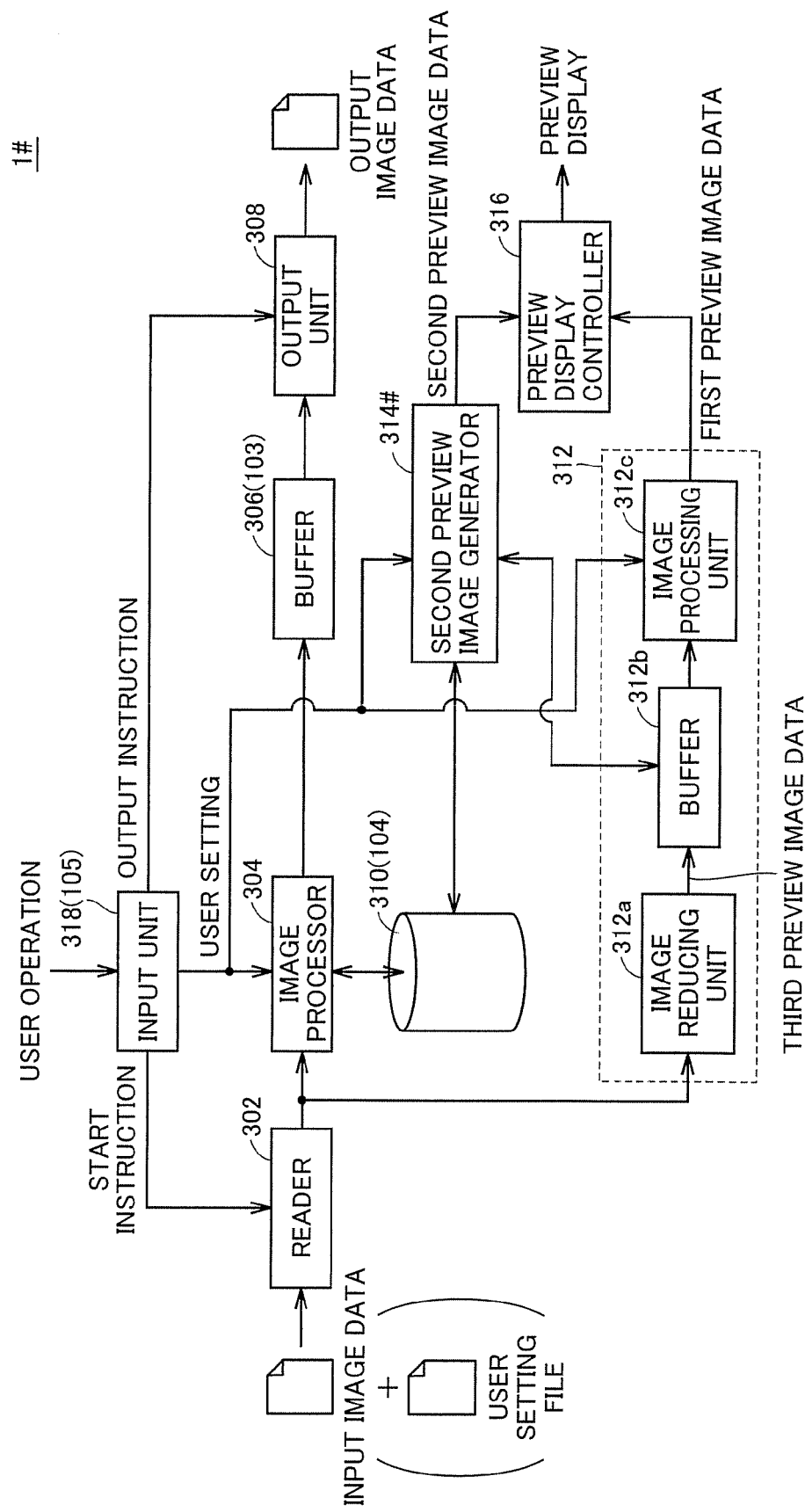
FIG. 18 is a block diagram showing a control structure in the MFP according to a modification of Embodiment 1 of the present invention.

Referring to FIG. 18, in a control structure of an MFP 1# according to the modification of Embodiment 1 of the present invention, a second preview image generator 314# is provided in place of second preview image generator 314 in the control structure of MFP 1 according to Embodiment 1 shown in FIG. 8. The other units are similar to those in FIG. 8, and thus, a detailed description thereof is not repeated.

While in MFP 1 according to Embodiment 1, image processor 304 temporarily generates the output image data for displaying a preview image on operation panel 105, in MFP 1# according to the modification of Embodiment 1, a preview image can be displayed without the generation of the output image data by image processor 304.

Referring to FIG. 18, specifically, second preview image generator 314# generates the second preview image data based on the third preview image data generated by image reducing unit 312a included in first preview image generator 312. Namely, second preview image generator 314# performs the image processing (image synthesis processing) equivalent to that of image processor 304 to the third preview image data stored in buffer 312b, in accordance with the user setting to generate the second preview image data. If the synthesis of a fixed pattern is instructed in the user setting, second preview image generator 314# also obtains the necessary fixed pattern from pattern storage 310.

As described above, in MFP 1# according to the modification of Embodiment 1, the second preview image data is generated from the third preview image data, which has a smaller image size than that of the input image data (and the output image data). Thus, an amount of processing relating to the generation of the second preview image data can be reduced, so that the preview display can be further speeded up.

<Regeneration Processing of Preview Image>

Similarly to the above-described Embodiment 1, when the user setting is changed after the preview image data corresponding to the output image data is displayed, a preview image is regenerated.

Specifically, when the user setting relating to the image synthesis processing is changed, first preview image generator 312 regenerates the first preview image data from the input image data, and second preview image generator 314# regenerates the second preview image data from the third preview image data restored in buffer 312b.

<Preview Display Processing>

The contents of the overall processing in MFP 1# according to the modification of the present embodiment are similar to those in the above-described flowchart shown in FIG. 16, except for the processing contents of the preview display subroutine (step S8), and thus a detailed description thereof is not repeated.

Figure 19:
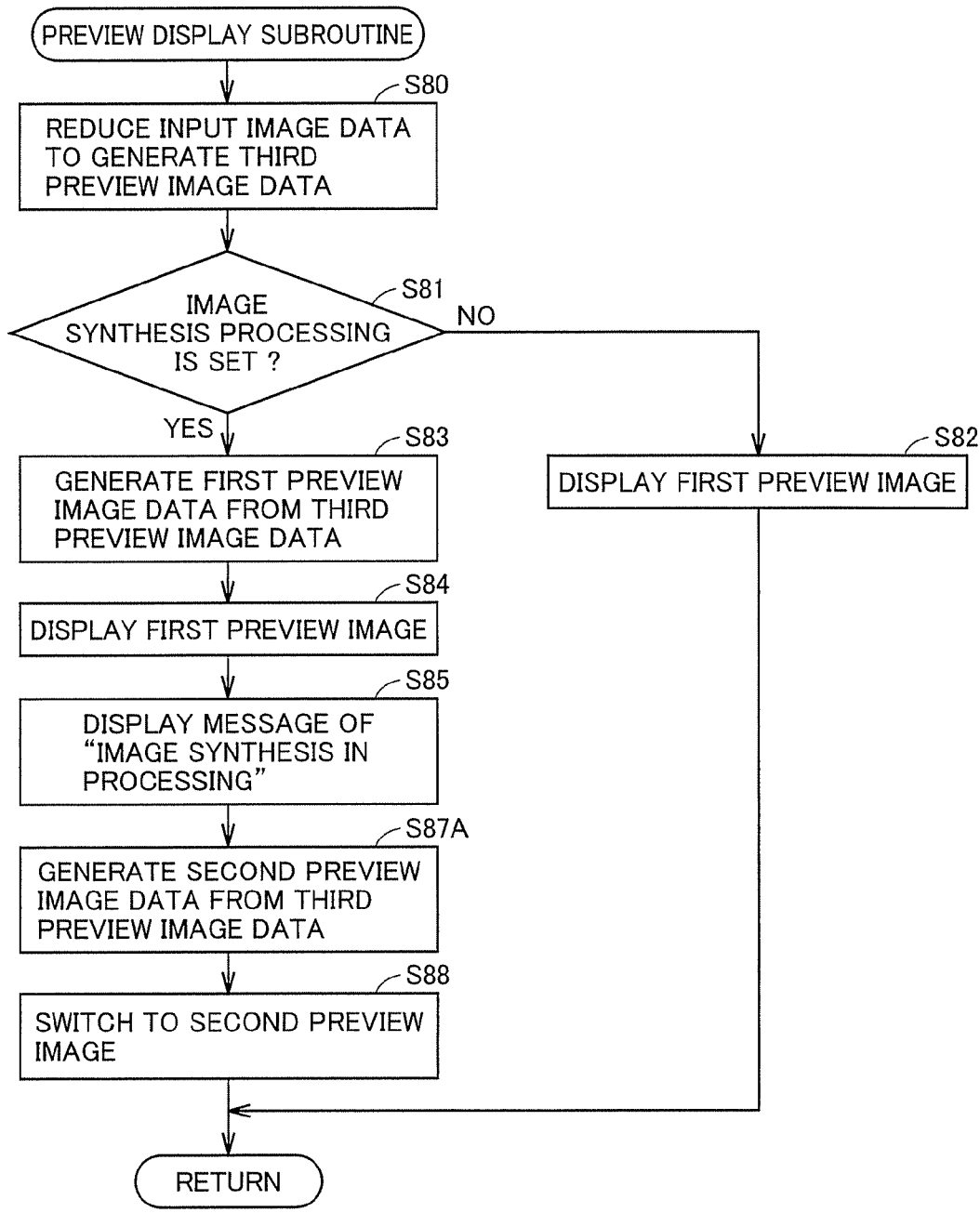
FIG. 19 is a flowchart showing processing of the preview display subroutine (step S8) shown in FIG. 16, according to the modification of Embodiment 1 of the present invention.

FIG. 19 is a flowchart showing the processing according to the modification of the present embodiment of the preview display subroutine shown in FIG. 16 (step S8). Among processing steps shown in FIG. 19, the same symbols are given to those having the processing contents similar to those in the processing steps shown in FIG. 17.

Referring to FIGS. 2, 18 and 19, CPU 101 functioning as image reducing unit 312a reduces the input image data read out in step S4 of FIG. 16 to generate the third preview image data (step S80). This third preview image data is stored in RAM 103 functioning as buffer 312b. Subsequently, CPU 101 functioning as image processing unit 312c determines whether or not the image synthesis processing is set as the user setting (step S81).

If the image synthesis processing is not set as the user setting (in a case of NO in step S81), CPU 101 functioning as image processing unit 312c outputs the third preview image data stored in RAM 103 as the first preview image data. CPU 101 functioning as preview display controller 316 displays the first preview image on operation panel 105 based on this first preview image data (the same as the third preview image data) (step S82). Then, the preview display subroutine ends, and the processing returns to step S10 in FIG. 16.

On the other hand, if the image synthesis processing is set as the user setting (in a case of YES in step S81), CPU 101 functioning as image processing unit 312c changes the screen appearance of a predetermined area of the third preview image data based on the contents of the user setting to generate the first preview image data (step S83). CPU 101 functioning as preview display controller 316 then displays the first preview image on operation panel 105 based on this first preview image data (step S84). Furthermore, CPU 101 displays the message of "IMAGE SYNTHESIS IN PROCESSING" on operation panel 105 (step S85).

Subsequently, CPU 101 functioning as second preview image processor 314# performs the image processing (image synthesis processing) to the third preview image data stored in RAM 103, in accordance with the user setting to generate the second preview image data (step S87A). CPU 101 functioning as preview display controller 316 switches the display on operation panel 105 from the first preview image based on the first preview image data to the second preview image based on the second preview image data (step S88). At this time, CPU 101 makes the message of "IMAGE SYNTHESIS IN PROCESSING" on operation panel 105 undisplayed.

This ends the preview display subroutine, and the processing returns to step S10 in FIG. 16.

<Functional Effect in Modification of the Present Embodiment>

According to the modification of Embodiment 1 of the present invention, in addition to the effect in the above-described Embodiment 1, the preview image based on the second preview image data can be displayed more quickly.

Embodiment 2

While in the above-described Embodiment 1, the configuration in which the image synthesis processing is executed as one example of the image processing is illustrated, in Embodiment 2 described below, a configuration in which image conversion processing of converting the input image data to second image data having a specified output mode is executed is illustrated as one example of the image processing.

For example, assuming a case where color input image data is printed out as a monochrome image, it is necessary that the input image data is converted to monochrome image data and then, is subjected to printing processing. Thus, in an MFP according to Embodiment 2, the conversion processing from the input image data to the output image data having a specific output mode is enabled.

The overall system according to Embodiment 2, a hardware configuration of an MFP 2 according to Embodiment 2 and the like are similar to those in the above-described Embodiment 1, and thus, a detailed description thereof is not repeated.

Figure 20:
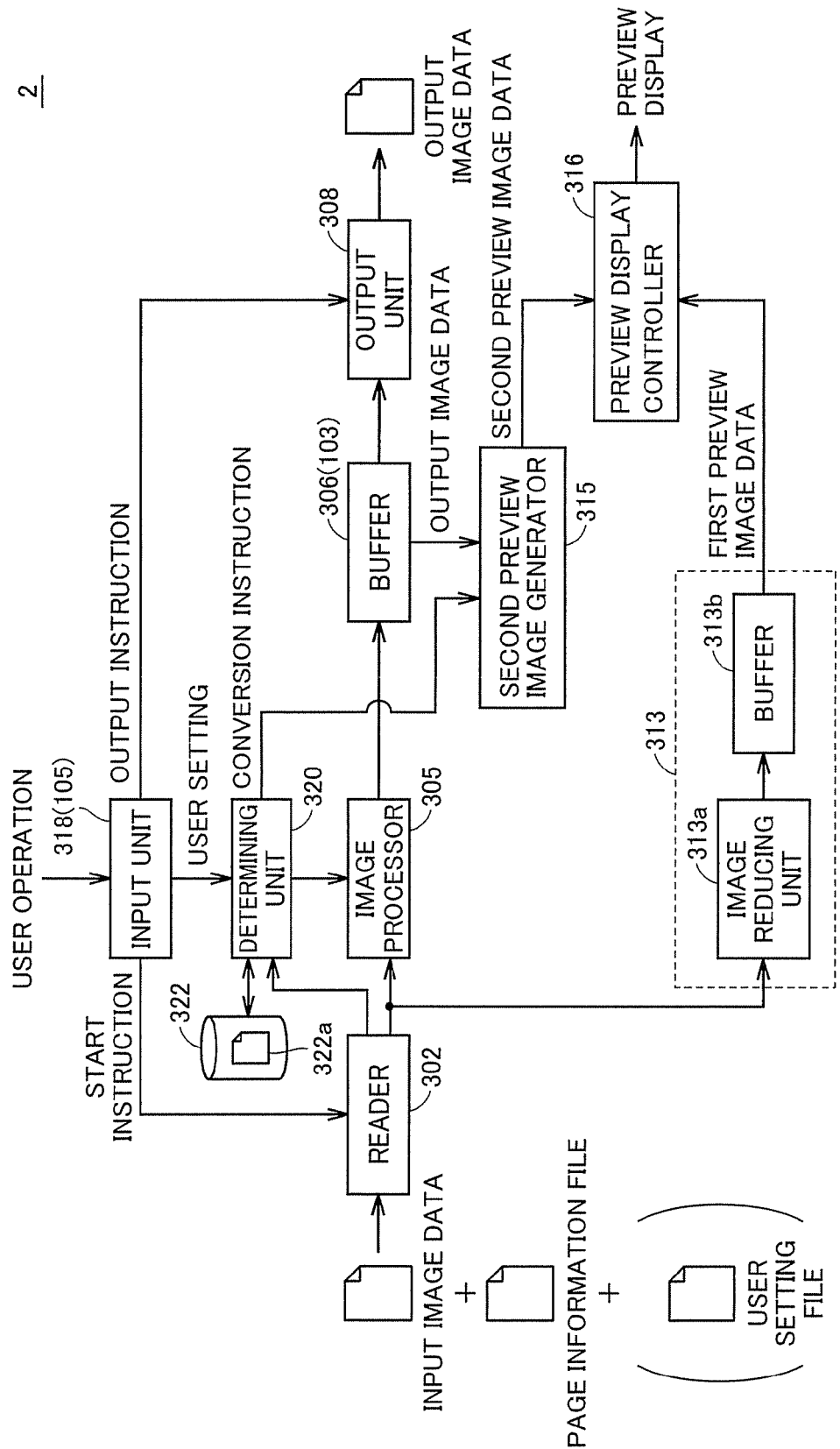
FIG. 20 is a block diagram showing a control structure in an MFP according to Embodiment 2 of the present invention.

<Control Structure>
Referring to FIG. 20, MFP 2 according to Embodiment 2 of the present invention includes, as a control structure, reader 302, an image processor 305, buffer 306, output unit 308, a first preview image generator 313, a second preview image generator 315, preview display controller 316, input unit 318, a determining unit 320, and a determination table storage 322. In this control structure, buffer 306 is typically implemented by allocating a specific area of RAM 103, and determination table storage 322 is implemented by allocating a specific area of hard disk 104. The other units are typically implemented by CPU 101 executing a control program. All or some included in the control structure may be implemented by hardware.

Input unit 318 outputs a corresponding internal command to the corresponding unit in accordance with an operation (user operation) of operation panel 105 (FIGS. 2 and 3) by the user. Specifically, input unit 318 outputs a start instruction to reader 302, outputs user setting to determining unit 320, and outputs an output instruction to output unit 308 in accordance with the user operation. In this user setting, the setting of an output mode of output image data is included. The output mode indicates an attribute of the output image data (e.g., image format, image gradation or the like). In the present embodiment, as one example, the output mode setting includes two items of "output application" and "output color".

Reader 302, in response to a start instruction from input unit 318, selectively reads out a specified input image data from hard disk 104 (FIG. 2). As will be described later, in hard disk 104, a page information file in which attributes (typically, image format, image gradation and the like) of the input image data are described has been stored in association with the input image data. This page information file is also generated at the time of generation of the input image data. The contents of the page information file may be incorporated in a portion of the input image data, and in this case, the input image data and the page information file can be dealt with as integrated data (file). Details of this page information file will be described later. Moreover, in a case where image scanner 106 (FIG. 2) scans a document and generates the input image data, the contents of the page information file may be concurrently outputted from image scanner 106.

Reader 302 outputs the read input image data to image processor 305 and first preview image generator 313, and outputs the read page information file to determining unit 320.

Figure 21:
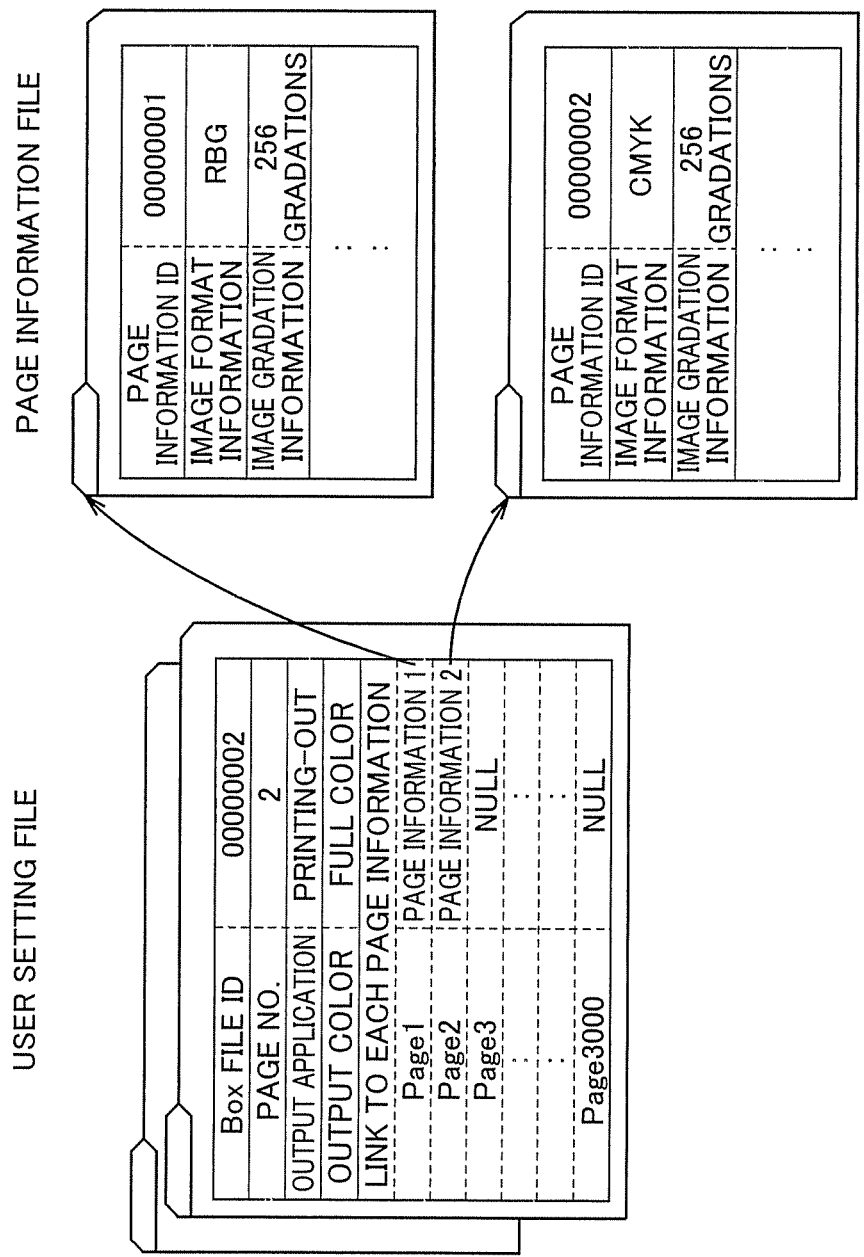
FIG. 21 is a diagram showing one example of contents of a user setting file and a page information file according Embodiment 2 of the present invention.

Referring to FIG. 21, a "BOX FILE ID" for specifying the input image data to be subjected to the image processing is defined in a user setting file according to Embodiment 2 of the present invention. Moreover, in the user setting file, the two items of "OUTPUT APPLICATION" and "OUTPUT COLOR" for specifying the output mode are also defined. Furthermore, in the user setting file, a "PAGE NUMBER" of the input image data to be subjected to the image processing is defined, and the association with the page information file is defined for each page.

In the page information file for each page, a "PAGE INFORMATION ID" for specifying the page of interest is defined, and "IMAGE FORMAT INFORMATION" and "IMAGE GRADATION INFORMATION" as the attributes of each page are defined.

The contents of the user setting file may be set by another apparatus such as personal computer PC and the like, besides the aspect in which the user operates operation panel 105 for setting. Alternatively, a Web-based interface may be provided.

Determining unit 320 determines requirement for the image conversion processing, based on the contents of the output mode setting included in the user setting (values of the "OUTPUT APPLICATION" and the "OUTPUT COLOR"), and the contents of the page information file associated with the specified input image data. In this determination, determining unit 320 refers to a determination table 322a stored in determination table storage 322.

Hereinafter, one example of the contents of determination table 322a is shown.

TABLE 1

| User setting (Output mode) | | Page information | | Format of preview image data | | |
|---|---|---|---|---|---|---|
| Output application | Output color | Format information | Gradation information | Format information | Gradation information | Conversion requirement |
| Printing-out | Full color | RGB | 256 gradations | RGB | 256 gradations | Not required |
| | | YMCK | 256 gradations | YMCK | 256 gradations | Not required |
| | | YMCK | 2 gradations | YMCK | 2 gradations | Not required |
| | | Gray scale | 256 gradations | Gray scale | 256 gradations | Not required |
| | Black | RGB | 256 gradations | Gray scale | 256 gradations | Required |
| | | YMCK | 256 gradations | Gray scale | 256 gradations | Required |
| | | YMCK | 2 gradations | Gray scale | 2 gradations | Required |
| | | Gray scale | 256 gradations | Gray scale | 256 gradations | Not required |
| Scanning-out | Full color | RGB | 256 gradations | RGB | 256 gradations | Not required |
| | | YMCK | 256 gradations | YMCK | 256 gradations | Not required |
| | | YMCK | 2 gradations | YMCK | 2 gradations | Not required |
| | | Gray scale | 256 gradations | Gray scale | 256 gradations | Not required |
| | Gray scale | RGB | 256 gradations | RGB | 256 gradations | Not required |
| | | YMCK | 256 gradations | YMCK | 256 gradations | Not required |
| | | YMCK | 2 gradations | YMCK | 2 gradations | Not required |
| | | Gray scale | 256 gradations | Gray scale | 256 gradations | Not required |
| | Monochrome binary | RGB | 256 gradations | Gray scale | 2 gradations | Required |
| | | YMCK | 256 gradations | Gray scale | 2 gradations | Required |
| | | YMCK | 2 gradations | Gray scale | 2 gradations | Required |
| | | Gray scale | 256 gradations | Gray scale | 2 gradations | Required |
| Facsimile | Monochrome binary | RGB | 256 gradations | Gray scale | 2 gradations | Required |
| | | YMCK | 256 gradations | Gray scale | 2 gradations | Required |
| | | YMCK | 2 gradations | Gray scale | 2 gradations | Required |
| | | Gray scale | 256 gradations | Gray scale | 2 gradations | Required |

In this determination table 322a, a total of four major items of "User setting (Output mode)", "Page information", "Format of preview image data", and "Conversion requirement" are defined. Determining unit 322 selects corresponding minor items of the "User setting (Output mode)" based on the contents of the user setting, selects corresponding minor items of the "Page information" based on the contents of the page information file, and obtains a value of the "Conversion requirement" (namely "Required" or "Not required") corresponding to a combination of these selected minor items. Determining unit 320 determines requirement of the image conversion processing based on this obtained value.

As the minor items of the "Output application" in determination table 322a, three items of "Printing-out", "Scanning-out" and "Facsimile" are defined. Among these, the "Printing-out" indicates a case where the setting is made so that the output image data is printed out. The "Scanning-out" indicates a case where the setting is made so that the output image data is stored in hard disk 104. The "Facsimile" indicates a case where the setting is made so that the output image data is transmitted by facsimile. Moreover, as the minor items of the "Output color", color modes in accordance with corresponding output destinations are defined.

If determining unit 320 determines that the image conversion processing is "Required", it outputs a conversion instruction to image processor 305 and second preview generator 315. This conversion instruction includes the contents of the "Format of preview image data" (values of "Format information" and "Gradation information") corresponding to determination table 322a. Namely, image processor 305 and second preview image generator 315 generate, from the input image data, the output image data or the second preview image data having the output mode specified in accordance with the "Format information" and "Gradation information" included in the conversion instruction. On the other hand, if determining unit 320 determines that the image conversion processing is "Not required", no conversion instruction is outputted.

Image processor 305, upon receiving the input image data from reader 302, performs the image processing (image conversion processing) in accordance with the conversion instruction only when the conversion instruction is received from determining unit 302, and generates the output image data. The output image data generated in image processor 305 is temporarily stored in buffer 306.

Output unit 308 outputs the output image data stored in buffer 306 to printer 107 (FIG. 2) and the like in response to an output instruction from input unit 318.

On the other hand, first preview image generator 313, second preview image generator 315 and preview display controller 316 operate to display a preview of the output image data on operation panel 105, when the preview display is instructed by the user.

Particularly, second preview image generator 315 according to the present embodiment operates only when the image conversion processing is determined to be "Required" by determining unit 320, that is, only when the conversion instruction is outputted from determining unit 320.

More specifically, first preview image generator 313 includes an image reducing unit 313a and a buffer 313b. Image reducing unit 313a reduces the input image data to generate the first preview image data that has an image size appropriate for the preview image. This first preview image data generated by image reducing unit 313a is temporarily stored in buffer 313b, and is outputted to preview display controller 316.

Meanwhile, if the conversion instruction is outputted from determining unit 320, second preview image generator 315 generates the preview image data from the output image data stored in buffer 306. More specifically, second preview image generator 315 reduces the output image data into the image size appropriate for the preview image to generate the second preview image data.

When the first preview image data is generated by first preview image generator 313, preview display controller 316 displays the preview image on operation panel 105 based on the first preview image data (first stage). Subsequently to this image, when the second preview image data is generated by second preview image generator 315, the display on operation panel 105 is updated to the preview image based on the second preview image data (second stage).

As described above, if no conversion instruction is outputted from determining unit 320, the second preview image data is not generated by second preview image generator 315, and thus, in this case, preview display controller 316 maintains the display of the preview image based on the first preview image data.

<Preview Display>

Figure 22:
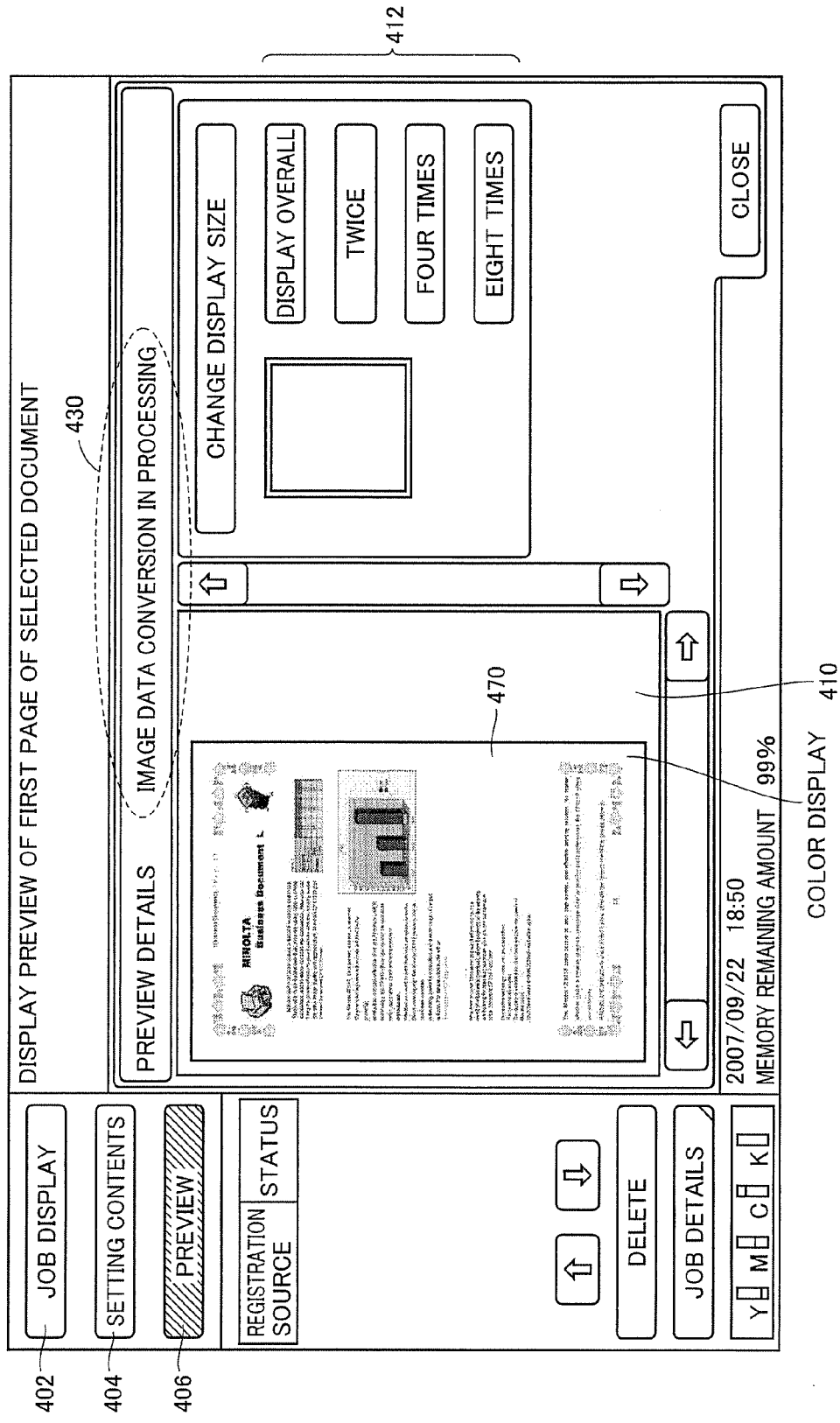
FIG. 22 is a diagram showing a screen example of a first stage of preview display according to Embodiment 2 of the present invention.
Figure 23:
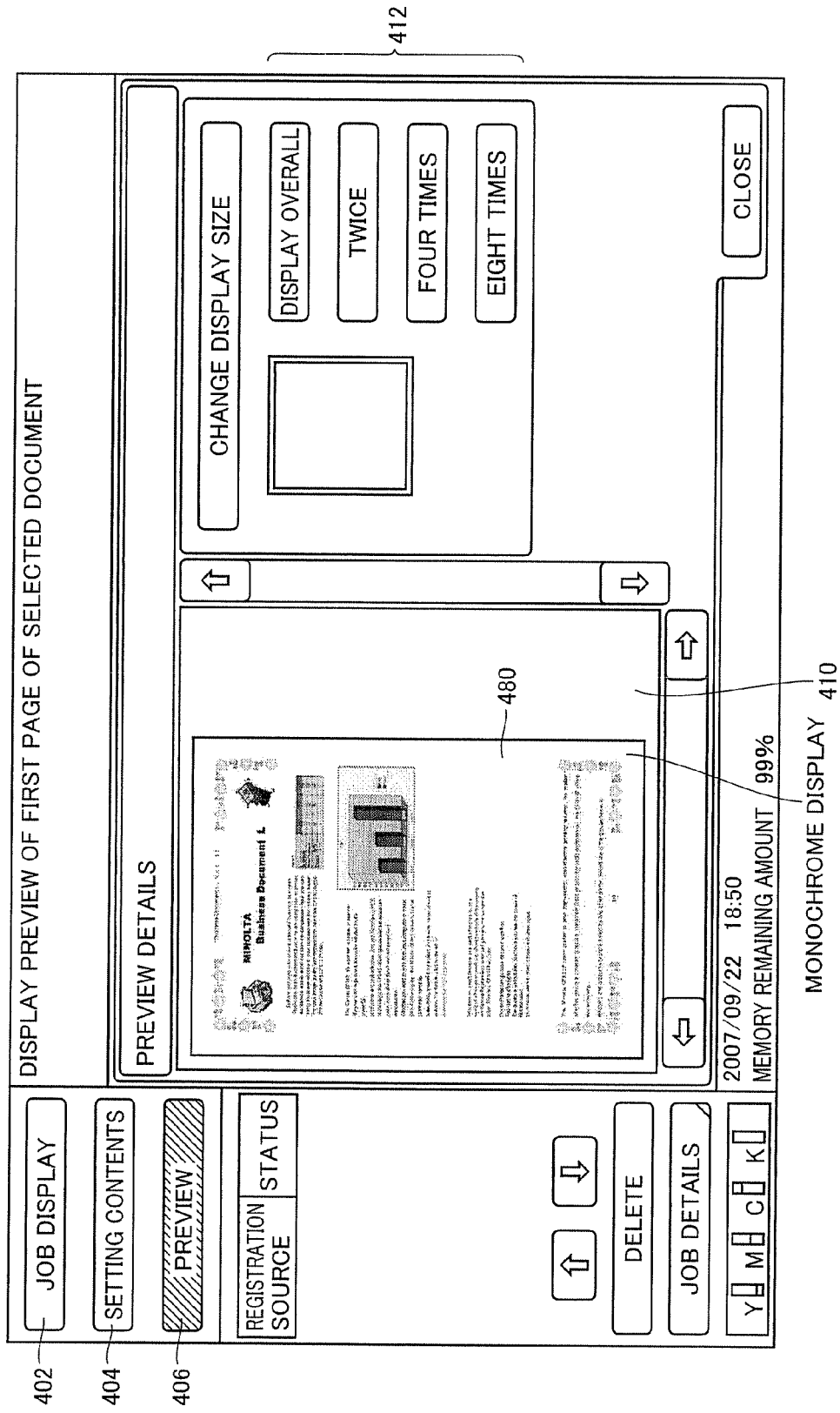
FIG. 23 is a diagram showing a screen example of a second stage of the preview display according to Embodiment 2 of the present invention.

Hereinafter, referring to FIGS. 22 and 23, one example of the preview display is described. In FIGS. 22 and 23, as one example of the image conversion processing, the preview display in a case where color input image data is outputted in monochrome is illustrated.

FIG. 22 shows a display example of the preview image based on the first preview image data, and FIG. 23 shows a display example of the preview image based on the second preview image data.

Preview display controller 316 (FIG. 20) causes a preview window as shown in FIGS. 22 and 23 to be displayed on operation panel 105 (FIGS. 2 and 3). This preview window is provided with preview display area 410, and in this preview display area 410, the preview image is displayed.

Moreover, job display button 402, setting contents button 404, preview button 406 and the like are arranged to the left side of the preview window. Furthermore, button group 412 for changing a size of the preview image displayed in preview display area 410 is arranged to the right side of preview display area 410. The operation when any one of these buttons is pressed is similar to that in FIGS. 9 and 10, and thus, a detailed description thereof is not repeated.

Referring to FIG. 22, first, when the user presses preview button 406, the preview image based on the first preview image data generated by first preview image generator 313 (FIG. 20) is displayed. Since the first preview image data is outputted as a color image similarly to the input image data, it is also displayed in color as the preview image.

On the other hand, after the preview display as shown in FIG. 22, if the image conversion processing is determined to be "Required", image processor 304 (FIG. 20) generates the output image data from the input image data. Subsequently, second preview image generator 315 generates the second preview image data from the output image data. When the generation of the second preview image data has been completed, the display on operation panel 105 is switched from the preview display shown in FIG. 21 to the preview display shown in FIG. 22. Since the second preview image data is outputted as a monochrome image similarly to the output image data, which corresponds the input image data after the conversion, it is also displayed in monochrome as the preview image.

Moreover, after a preview image 470 based on the first preview image data is displayed (FIG. 22), preview display controller 316 (FIG. 20) displays a message 430 of "IMAGE DATA CONVERSION IN PROCESSING" indicating that the second preview image data is being generated, until the display is switched to a preview image 480 based on the second preview image data (FIG. 23).

As described above, when the user instructs the preview display and when the image conversion processing is required, preview image 470 corresponding to the input image is first displayed quickly, and subsequently, preview image 480 corresponding to the output image data obtained by converting the input image data is displayed. Thus, the user can check final output without feeling stress due to time required for performing the image processing.

<Regeneration Processing of Preview Image>

When the user checks the preview image as shown in FIG. 23, and then, changes the user setting relating to the image conversion processing, a preview image is regenerated.

Again, referring to FIG. 20, when the user setting is changed, first preview image generator 313 regenerates the first preview image data from the input image data. On the other hand, image processor 305 also performs the image processing in accordance with the user setting after the change to regenerate the output image data. Furthermore, second preview image generator 315 regenerates the second preview image data from this regenerated output image data. In this manner, the preview images as shown in the above-described FIGS. 22 and 23 are redisplayed based on the first and second preview image data generated by first and second preview image generators 313 and 315, respectively.

In this manner, since the preview image after setting change is quickly displayed on operation panel 105, the user can set the contents of the desired image conversion processing while checking the final output.

Whether it is before or after the user setting relating to the image conversion processing, if the image conversion processing is determined to be not required, the regeneration processing of the preview image may not be performed.

<Overall Processing>

Figure 24:
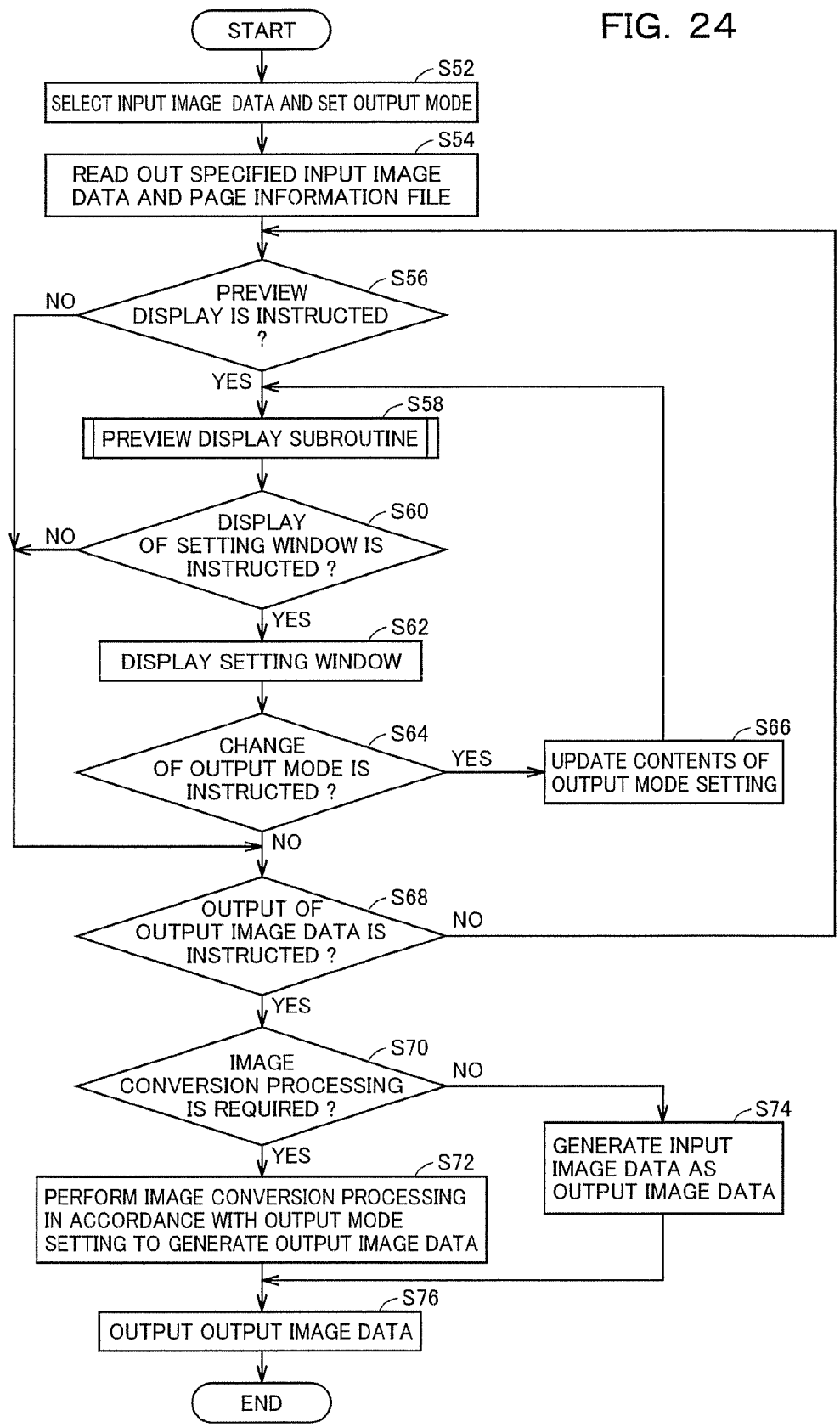
FIG. 24 is a flowchart showing overall processing in the MFP according to Embodiment 2 of the present invention.

Next, referring to FIGS. 2, 20 and 24, overall processing relating to the above-described image conversion processing is described.

A user who will output an input image data to a specific output destination operates operation panel 105 to select the input image data as an object, and to set an output mode (step S52). This output mode setting (user setting) is stored in RAM 103, hard disk 104 or the like.

When the user presses start key 128 on operation panel 105 after setting the output mode, input unit 318 outputs a start instruction to CPU 101 functioning as reader 302. In response to this start instruction, CPU 101 functioning as reader 302 reads out the specified input image data and a corresponding page information file from hard disk 104 (step S54). If the user setting file including the output mode setting is stored in hard disk 104 in advance, CPU 101 also reads out the user setting file.

Subsequently, CPU 101 determines whether or not the preview display is instructed by the user (step S56). If the preview display is instructed (in a case of YES in step S56), CPU 101 executes a preview display subroutine (step S58) to display a preview image on operation panel 105. After the execution of this preview display subroutine, CPU 101 determines whether or not the display of the setting window is instructed by the user (step S60).

If the display of the setting window is instructed by the user (in a case of YES in step S60), CPU 101 displays the setting window for changing the output mode setting (user setting) on operation panel 105 (step S62). Furthermore, CPU 101 determines whether or not change of the user setting is instructed on the setting window (step S64).

If any change of the output mode is instructed on the setting window (in a case of YES in step S64), CPU 101 reflects the change contents on the stored output mode setting (user setting) to update the contents of the output mode setting (step S66). CPU 101 again executes the preview display subroutine based on the output mode setting after this change (step S58) to update the preview image on operation panel 105.

On the other hand, if the preview display is not instructed (in a case of NO in step S56), if the display of the setting window is not instructed by the user (in a case of NO in step S60), or if no change of the user setting is instructed on the setting window (in a case of NO in step S64), CPU 101 determines whether or not the output of the output image data is instructed (step S68).

If the output of the output image data is instructed (in a case of YES in step S68), CPU 101 functioning as determining unit 320 determines whether or not the image conversion processing is required based on the contents of the output mode setting and the contents of the page information file associated with the specified input image data (step S70).

If the image conversion processing is determined to be required (in a case of YES in step S70), CPU 101 functioning as image processor 305 performs the image processing (image conversion processing) to the input image data read out in step S54 in accordance with the specified output mode setting to generate the output image data (step S72). This output image data is stored in RAM 103 functioning as buffer 306.

On the other hand, if the image conversion processing is determined to be not required (in a case of NO in step S70), CPU 101 functioning as image processor 305 generates the input image data read out in step S54 as the output image data as it is (step S74).

Subsequently, CPU 101 functioning as output unit 308 outputs the output image data generated in step S72 or in step S74 (step S76). Then, a series of processing ends.

If the output image data has been already generated for displaying the preview image, the processing in step S72 or in step S74 may be skipped.

On the other hand, if the output of the output image data is not instructed (in a case of NO in step S68), CPU 101 repeatedly executes the processing in step S56 and later.

<Preview Display Processing>

Figure 25:
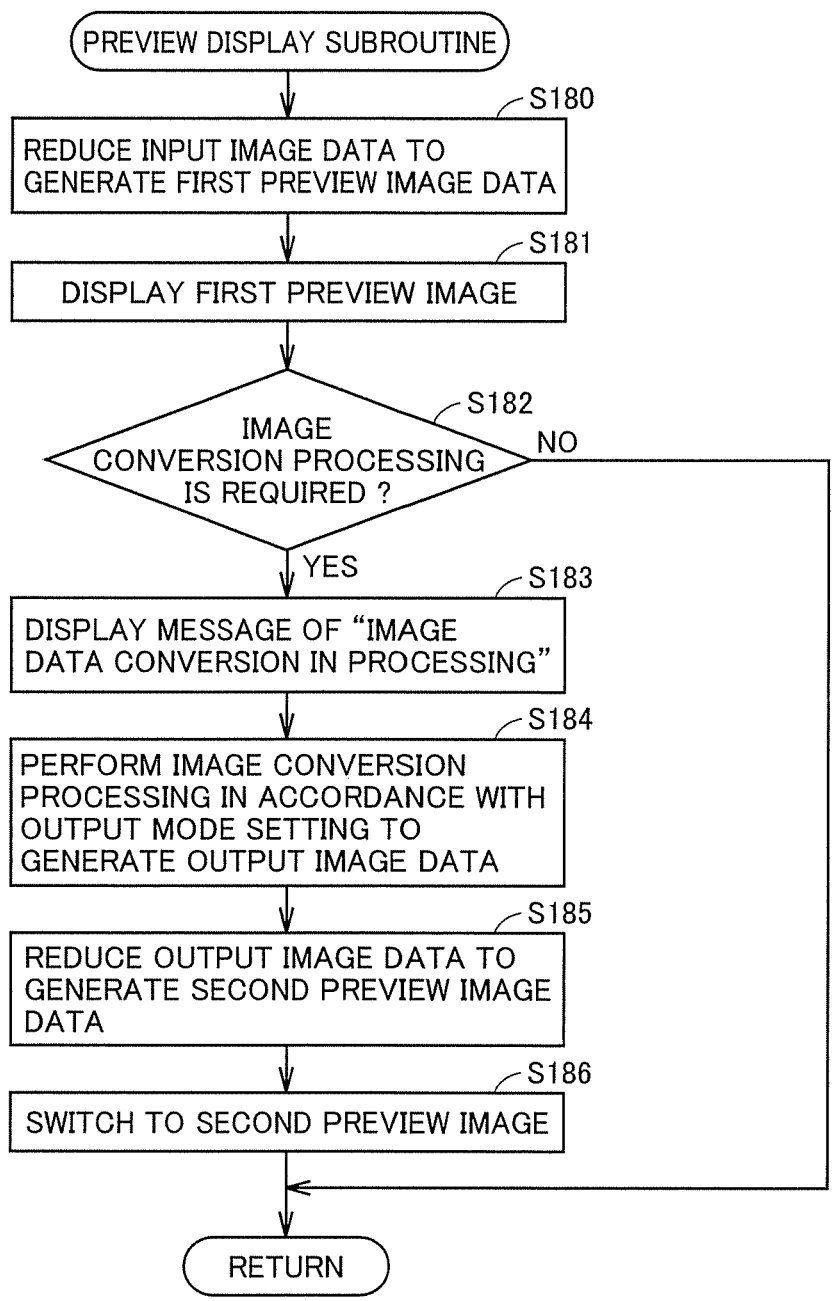
FIG. 25 is a flowchart showing processing of a preview display subroutine (step S58) shown in FIG. 24.

Referring to FIGS. 2, 20 and 25, CPU 101 functioning as image reducing unit 313*a* reduces the input image data read out in step S54 of FIG. 24 to generate the first preview image data (step S180). This first preview image data is stored in RAM 103 functioning as buffer 313*b*. CPU 101 functioning as preview display controller 316 displays the first preview image on operation panel 105 based on this first preview image data (step S181).

Subsequently, CPU 101 functioning as determining unit 320 determines whether or not the image conversion processing is required based on the contents of the output mode setting and the contents of the page information file associated with the specified input image data (step S182).

If the image conversion processing is determined to be required (in a case of YES in step S182), CPU 101 functioning as preview display controller 316 displays the message of "IMAGE DATA CONVERSION IN PROCESSING" on operation panel 105 (step S183). Subsequently, CPU 101 functioning as image processor 305 performs the image processing (image conversion processing) to the input image data read out in step S54 of FIG. 24, in accordance with the specified output mode setting to generate the output image data (step S184). This output image data is stored in RAM 103 functioning as buffer 306.

Furthermore, CPU 101 functioning as second preview image generator 315 reduces the output image data generated in step S184 to generate the second preview image data (step S185). CPU 101 functioning as preview display controller 316 switches the display on operation panel 105 from the first preview image based on the first preview image data to the second preview image based on the second preview image data (step S186). At this time, CPU 101 makes the message of "IMAGE DATA CONVERSION IN PROCESSING" on operation panel 105 undisplayed. The processing then returns to step S60 in FIG. 24.

On the other hand, if the image conversion processing is determined to be not required (in a case of NO in step S182), CPU 101 generates neither of the output image data and the second preview image data, and ends the preview display subroutine with the display of the first preview image maintained. The processing then returns to step S60 in FIG. 24.

<Functional Effect in the Present Embodiment>

According to Embodiment 2 of the present invention, in the preview display of the output image data, the preview image based on the first preview image data generated from the input image data is first displayed quickly, and subsequently to this image, if the image conversion processing is required, the second preview image data is generated from the output image data after the image conversion, and the preview image based on this second preview image data is displayed. This can alleviate stress that the user feels due to the time required for the preview display, and the contents relating to the desired image conversion processing can be set quickly.

Modification of Embodiment 2

As a modification of Embodiment 2 of the present invention, a configuration in which the generation processing of the second preview image data corresponding to the output image data is modified is illustrated. Basically, configurations other than the configuration relating to the generation of the second preview image data are similar to those of the above-described Embodiment 1 or 2, and thus, a detailed description thereof is not repeated.

<Control Structure>

Figure 26:
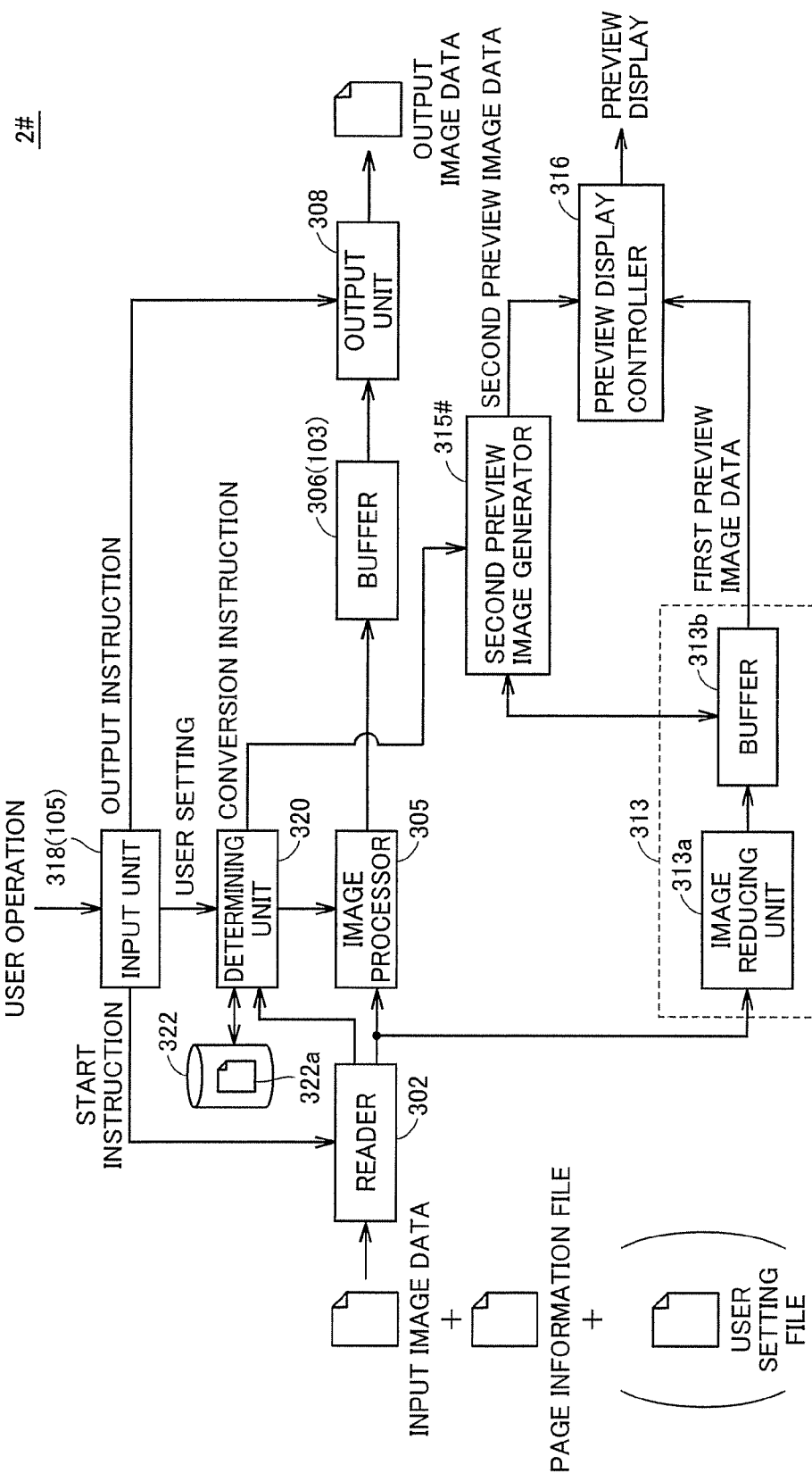
FIG. 26 is a block diagram showing a control structure in an MFP according to a modification of Embodiment 2 of the present invention.

Referring to FIG. 26, in a control structure of an MFP 2# according to the modification of Embodiment 2 of the present invention, a second preview image generator 315# is provided in place of second preview image generator 315 in the control structure of MFP 2 according to Embodiment 2 shown in FIG. 20. The other units are similar to those in FIG. 20, and a detailed description thereof is not repeated.

While in MFP 2 according to Embodiment 2, image processor 305 temporarily generates the output image data for displaying a preview image on operation panel 105, in MFP 2# according to the modification of Embodiment 2, a preview image can be displayed without the generation of the output image data by image processor 305.

Referring to FIG. 26, specifically, second preview image generator 315# generates the second preview image data based on the first preview image data generated by image reducing unit 313a included in first preview image generator 313. Namely, second preview image generator 315# performs the image processing (image conversion processing) equivalent to that of image processor 305 to the first preview image data stored in buffer 313b, in accordance with the specified output mode setting to generate the second preview image data.

As described above, in MFP 2# according to the modification of Embodiment 2, the second preview image data is generated from the first preview image data, which has a smaller image size than that of the input image data. Thus, an amount of processing relating to the generation of the second preview image data can be reduced, so that the preview display can be further speeded up.

<Regeneration Processing of Preview Image>

Similarly to the above-described Embodiment 2, when the user setting is changed after the preview image data corresponding to the output image data is displayed, a preview image is regenerated.

Specifically, when the user setting relating to the image conversion processing is changed, second preview image generator 315# regenerates the second preview image data from the first preview image data stored in buffer 313b of the first preview image generator 313. Image reducing unit 313a does not need to regenerate the first preview image, unless the specified input image data is changed.

<Preview Display Processing>

The contents of the overall processing in MFP 2# according to the modification of Embodiment 2 are similar to those in the above-described flowchart shown in FIG. 24, except for the processing contents of the preview display subroutine (step S58), and thus a detailed description thereof is not repeated.

Figure 27:
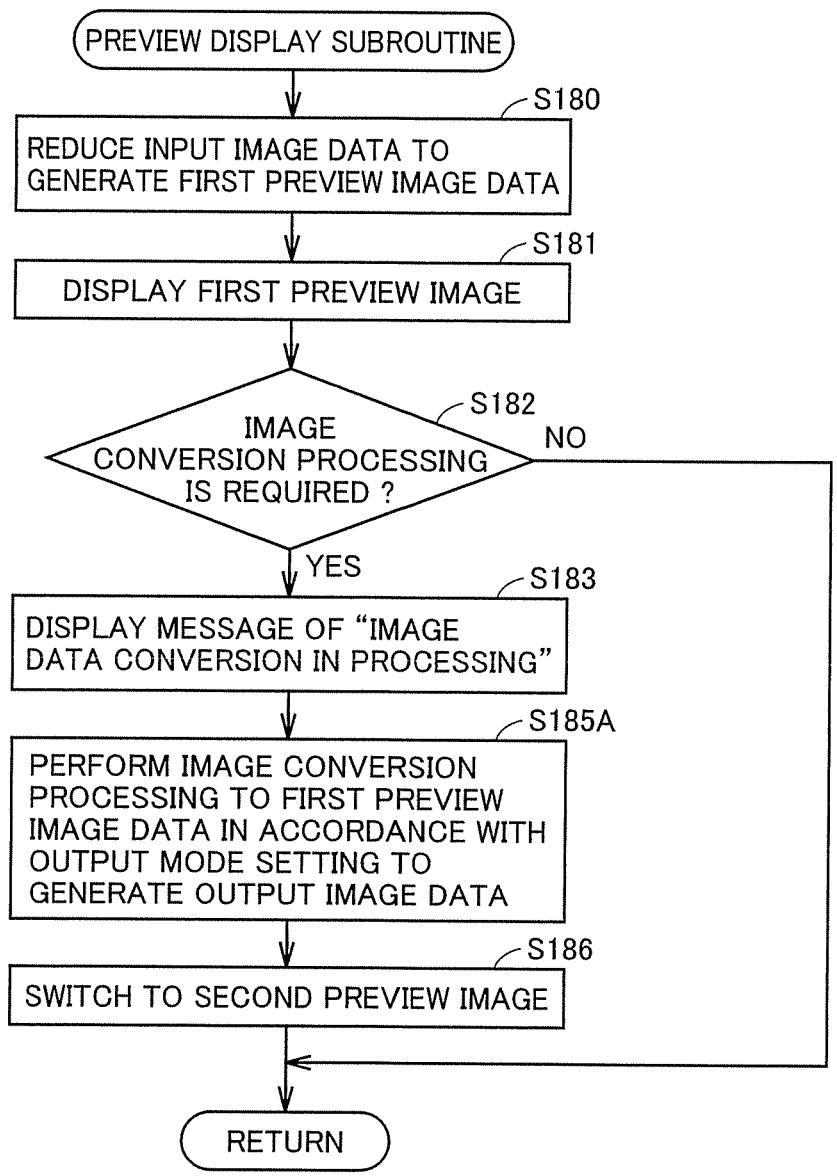
FIG. 27 is a flowchart showing processing of the preview display subroutine (step S58) shown in FIG. 24, according to the modification of Embodiment 2 of the present invention.

FIG. 27 shows a flowchart showing the processing according to the modification of the present embodiment of the preview display subroutine shown in FIG. 24 (step S58). Among processing steps shown in FIG. 27, the same symbols are given to those having the processing contents similar to those of the processing steps shown in FIG. 25.

Referring to FIGS. 2, 20 and 27, CPU 101 functioning as image reducing unit 313a reduces the input image data read out in step S54 in FIG. 24 to generate the first preview image data (step S180). This first preview image data is stored in RAM 103 functioning as buffer 313b. CPU 101 functioning as preview display controller 316 displays the first preview image on operation panel 105 based on this first preview image (step S181).

Subsequently, CPU 101 functioning as determining unit 320 determines whether or not the image conversion processing is required based on the contents of the output mode setting and the contents of the page information file associated with the specified input image data (step S182).

If the image conversion processing is determined to be required (in a case of YES in step S182), CPU 101 functioning as preview display controller 316 displays the message of "IMAGE DATA CONVERSION IN PROCESSING" on operation panel 105 (step S183). Subsequently, CPU 101 functioning as second preview image generator 315# performs the image processing (image conversion processing) to the first preview image data stored in RAM 103 in accordance with the specified output mode setting to generate the second preview image data (step S185A). CPU 101 functioning as the preview as preview display controller 316 switches the display on operation panel 105 from the first preview image based on the first preview image data to the second preview image based on the second preview image data (step S186). At this time, CPU 101 makes the message of "IMAGE DATA CONVERSION IN PROCESSING" on operation panel 105 undisplayed. The processing returns to steps S60 in FIG. 24.

On the other hand, if the image conversion processing is determined to be not required (in a case of NO in step S182), CPU 101 does not generate the second preview image data, and ends the preview display subroutine with the display of the first preview image maintained. The processing returns to step S60 in FIG. 24.

<Functional Effect in Modification of the Present Embodiment>

According to the modification of Embodiment 2 of the present invention, in addition to the effect in the above-described Embodiment 2, the preview image based on the second preview image data can be more quickly displayed.

Other Embodiments

In the above-described embodiments, the configurations in which the image processing apparatus according to the present invention is implemented by the MFP are illustrated, the image processing apparatus according to the present invention may be implemented using a personal computer on which a document creation application and the like are executed. In this case, installing an image processing program according to the present invention in the personal computer allows the personal computer to function as the image processing apparatus according to the present invention. The document creation application executed in the personal computer may generate input image data as an object.

Furthermore, the image processing program according to the present invention may also read out necessary modules in a predetermined sequence and at predetermined timing among program modules provided as a part of the operating system so as to cause the modules to execute the processing. In this case, the above-described modules may not be included in the program itself, but the processing may be executed in cooperation with the operating system. The program not including the above-described modules can also be included by the program according to the present invention.

The image processing program according to the present invention may also be provided by being incorporated in a part of another program. Also, in this case, the modules included in the above-described another program are not included in the program itself, but the processing is executed in cooperation with the other program. The above-described program incorporated in the other program can also be included by the program according to the present invention.

A provided program product is installed in a program storage such as a hard disk to be executed. The program product includes the program itself, and a storage medium in which the program is stored.

Furthermore, some or all of the functions implemented by the image processing program according to the present invention may be configured by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
   a display;
   an input unit for receiving an operation by a user for user setting;
   an image processor for image-processing first image data in accordance with said user setting to generate second, composite image data, wherein
   said image-processing includes image synthesis processing of composing third image data on said first image data to generate said second, composite image data; and
   a controller for providing a preview display on said display, wherein
   said controller includes;
      a first image generator for generating first preview image data from said first image data, wherein said first image generator is configured to generate said first preview image data by changing a screen appearance of a portion of an area on said first image data corresponding to an area in which said third image data is to be composed, and for displaying a first preview image on said display, based on the generated first preview image data, while said image-processing is being performed, and
   a second image generator for generating second preview image data corresponding to said second, composite image data generated by said image processing, and for updating said preview display on said display from said first preview image to a second preview image based on the generated second preview image data,
   and wherein said controller is configured to cause said display to display, in addition to said preview display, an indication that generation of said second preview image data is in processing during at least a part of a period between the time said first preview image is displayed and the time the displayed first preview image is updated to said second preview image.

2. The image processing apparatus according to claim 1, wherein
   said second image generator is configured to generate said second preview image data from said second, composite image data generated by said image processor.

3. The image processing apparatus according to claim 1, wherein said first image generator is further configured to:
   generate third preview image data having a smaller image size than said first image data,
   store the generated third preview image data, and
   generate said first preview image data from said third preview image data, and
   said second image generator is configured to generate said second preview image data from said third preview image data stored by said first image generator.

4. The image processing apparatus according to claim 3, wherein
   said second image generator is further configured to regenerate, in response to change of said user setting relating to the image synthesis processing, said second preview image data from said third preview image data stored by said first image generator.

5. The image processing apparatus according to claim 1, wherein said first image generator is configured to generate said first preview image data by executing at least any one of:
   adding a frame indicating the area in which said third image data is to be composed,
   changing a characteristic value of a pixel included in the area in which said third image data is to be composed, and
   replacing the area in which said third image data is to be composed by a predetermined pattern image.

6. The image processing apparatus according to claim 1, wherein
   said image-processing includes image conversion processing of converting said first image data to said second, composite image data having an output mode specified by said user setting,
   said image processor is configured to,
      determine a requirement of the image conversion processing based on an attribute of said first image data and said user setting, and
      execute the image conversion processing to generate said second, composite image data when the image conversion processing is determined to be required.

7. The image processing apparatus according to claim 6, wherein
   said second image generator is configured to generate said second preview image data from the generated second, composite image data when the image conversion processing of said first image data is executed by said image processor.

8. The image processing apparatus according to claim 6, wherein said first image generator is configured to:
generate said first preview image data having a smaller image size than said first image data, and
store the generated first preview image data, and
said second image generator is configured to image-convert said first preview image data stored by said first image generator to generate said second preview image data.

9. The image processing apparatus according to claim 8, wherein
said second image generator is configured to regenerate, in response to change of said user setting relating to the image conversion processing, said second preview image data from said first preview image data stored by said first image generator.

10. An image processing method in an image processing apparatus including a display and an input unit, comprising the steps of:
image-processing first image data in accordance with a user setting to generate second, composite image data, wherein said image-processing includes image synthesis processing of composing third image data on said first image data to generate said second, composite image data; and
providing a preview display on said display prior to outputting said second image data, wherein
said step of providing said preview display includes the steps of:
generating first preview image data from said first image data,
displaying a first preview image on said display, based on the generated first preview image data, while said image-processing is being performed, said step of displaying said first preview image including the step of generating said first preview image data by changing a screen appearance of a portion of an area on said first image data corresponding to an area in which said third image data is to be composed,
generating second preview image data corresponding to said second, composite image data generated by said image-processing,
updating said preview display on said display from said first preview image to a second preview image based on the generated second preview image data, and
displaying an indication that generation of said second preview image data is in processing during at least a part of a period between the time said first preview image is displayed and the time the displayed first preview image is updated to said second preview image.

11. The image processing method according to claim 10, wherein said step of generating said second preview image data includes the step of generating said second preview image data from said second, composite image data.

12. The image processing method according to claim 10, wherein said step of generating said first preview image data includes the steps of:
generating third preview image data having a smaller image size than said first image data;
storing said generated third preview image data, and
generating said first preview image data from said third preview image data, and
said step of generating said second preview image data includes the step of generating said second preview image data from the stored third preview image data.

13. The image processing method according to claim 12, further comprising the step of regenerating, in response to change of said user setting relating to the image synthesis processing, said second preview image data from the stored third preview image data.

14. The image processing method according to claim 10, wherein said step of displaying said first preview image includes the step of generating said first preview image data by executing at least any one of:
adding a frame indicating the area in which said third image data is to be composed,
changing a characteristic value of a pixel included in the area in which said third image data is to be composed, and
replacing the area in which said third image data is to be composed by a predetermined pattern image.

15. The image processing method according to claim 10, wherein said image-processing includes image conversion processing of converting said first image data to said second, composite image data having an output mode specified by said user setting,
said step of generating said second, composite image data includes the steps of:
determining a requirement of the image conversion processing based on an attribute of said first image data and said user setting, and
executing the image conversion processing to generate said second, composite image data when the image conversion processing is determined to be required.

16. The image processing method according to claim 15, wherein
said step of generating said second preview image data includes the step of generating said second preview image data from the generated second, composite image data when the image conversion processing to said first image data is executed.

17. The image processing method according to claim 15, wherein said step of generating said first preview image data includes the steps of;
generating said first preview image data having a smaller image size than said first image data, and
storing the generated first preview image data, and
said step of generating the second preview image data includes the step of image-converting the stored first preview image data to generate said second preview image data.

18. The image processing method according to claim 17, further comprising the step of:
regenerating, in response to change of said user setting relating to the image conversion processing, said second preview image data from the stored first preview image data.

19. A non-transitory computer-readable medium that stores an image processing program for executing an image processing method in a computer having a display and an input unit, said image processing program causing said computer to execute the steps of:
image-processing first image data in accordance with user setting to generate second, composite image data, wherein said image-processing includes image synthesis processing of composing third image data on said first image data to generate said second, composite image data; and
providing a preview display on said display prior to outputting said second, composite image data, wherein
said step of providing said preview display including the steps of:
generating first preview image data from said first image data, displaying a first preview image on said display, based on the generated first preview image data, while said image-processing is being performed, said step of displaying said first preview image including the step of generating said first preview image data by changing a screen appearance of a portion of an area on said first image data corresponding to an area in which said third image data is to be composed, generating second preview image data corresponding to said second, composite image data generated by said image-processing, updating said preview display on said display from said first preview image to a second preview image based on the generated second preview image data, and displaying an indication that generation of said second preview image data is in processing during at least a part of a period between the time said first preview image is displayed and the time the displayed first preview image is updated to said second preview image.

* * * * *